(12) United States Patent
Toyoura

(10) Patent No.: US 11,481,017 B2
(45) Date of Patent: Oct. 25, 2022

(54) POWER REDUCTION IN AN AUTONOMOUS MOBILE BY STOPPING DATA PROCESSING IN AN UPSTREAM NODE WHEN THERE IS NO DOWNSTREAM NODE USING THE OUTPUT DATA

(71) Applicant: Sony Corporation, Tokyo (JP)

(72) Inventor: Masataka Toyoura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 16/648,674

(22) PCT Filed: Jul. 13, 2018

(86) PCT No.: PCT/JP2018/026526
§ 371 (c)(1),
(2) Date: Mar. 19, 2020

(87) PCT Pub. No.: WO2019/064828
PCT Pub. Date: Apr. 4, 2019

(65) Prior Publication Data
US 2020/0218331 A1    Jul. 9, 2020

(30) Foreign Application Priority Data

Sep. 26, 2017    (JP) .............................. JP2017-184517

(51) Int. Cl.
*G06F 1/32*        (2019.01)
*G06F 1/3234*     (2019.01)
(Continued)

(52) U.S. Cl.
CPC ........ *G06F 1/3278* (2013.01); *B60R 16/0238* (2013.01); *G06F 1/3287* (2013.01); *G06F 15/82* (2013.01)

(58) Field of Classification Search
None
See application file for complete search history.

(56) References Cited

U.S. PATENT DOCUMENTS

2006/0146485 A1*  7/2006  Stancil ................... G01R 31/69
                                                           361/621
2012/0297228 A1* 11/2012  Graves ...................... G06F 1/28
                                                           713/340
(Continued)

FOREIGN PATENT DOCUMENTS

| JP | 01-29937 A    | 1/1989 |
| JP | 07-13958 A    | 1/1995 |
| JP | 2011-54082 A  | 3/2011 |

OTHER PUBLICATIONS

International Search Report and Written Opinion dated Oct. 9, 2018 for PCT/JP2018/026526 filed on Jul. 13, 2018, 9 pages including English Translation of the International Search Report.

*Primary Examiner* — Danny Chan
(74) *Attorney, Agent, or Firm* — Xsensus LLP

(57) ABSTRACT

To achieve a reduction of power consumption by stopping an inter-node data input/output process and node processing by autonomous control of each node without using a management table. Included are a data processing unit that performs predetermined processing on data input from an upstream node; and a data output management unit that outputs, to a downstream node, the data on which the predetermined processing has been performed in the data processing unit, and monitors a state of the downstream node. The data output management unit controls the data processing unit to stop the data processing in a case of detecting that there is no downstream node using the output data. The stop of node processing and inter-node data input/output are performed upstream in a chain manner.

6 Claims, 14 Drawing Sheets

(51) Int. Cl.
 *B60R 16/023* (2006.01)
 *G06F 1/3287* (2019.01)
 *G06F 15/82* (2006.01)

(56) References Cited

U.S. PATENT DOCUMENTS

| | | | | |
|---|---|---|---|---|
| 2014/0233544 A1* | 8/2014 | McCann | ............... | H04W 48/16 |
| | | | | 370/338 |
| 2014/0237079 A1* | 8/2014 | Lockerbie | .......... | H04N 21/2146 |
| | | | | 709/218 |
| 2016/0147271 A1* | 5/2016 | Brown | .................... | H04L 12/12 |
| | | | | 713/330 |
| 2019/0179330 A1* | 6/2019 | Oniwa | ................. | G05D 1/0223 |
| 2019/0315350 A1* | 10/2019 | Oguro | ............... | B60W 30/0956 |

\* cited by examiner

*FIG. 2*

| INPUT / OUTPUT | NODE A | NODE B | NODE C | NODE D | ⋮ |
|---|---|---|---|---|---|
| NODE A | | × | × | × | ⋮ |
| NODE B | ○ | | × | × | ⋮ |
| NODE C | × | ○ | | × | ⋮ |
| NODE D | ○ | × | × | | ⋮ |
| ⋮ | ⋮ | ⋮ | ⋮ | ⋮ | |

POWER REDUCTION IN AN AUTONOMOUS MOBILE BY STOPPING DATA PROCESSING IN AN UPSTREAM NODE WHEN THERE IS NO DOWNSTREAM NODE USING THE OUTPUT DATA

CROSS-REFERENCE TO RELATED APPLICATIONS

The present application is based on PCT filing PCT/JP2018/026526, filed Jul. 13, 2018, which claims priority to JP 2017-184517, filed Sep. 26, 2017, the entire contents of each are incorporated herein by reference.

TECHNICAL FIELD

The present disclosure relates to an information processing apparatus and method, an autonomous mobile apparatus and method, and a program. More specifically, the present disclosure relates to an information processing apparatus and method, an autonomous mobile apparatus and method, and a program that achieve a reduction of power consumption and processing resources in a distributed data processing system in which a plurality of processes is performed at respective nodes and data input/output is performed between the nodes.

BACKGROUND ART

A distributed data processing system has a configuration for implementing a large function by connecting two or more so-called nodes which are, for example, small unit functions having an input function and an output function.

A single node in the system receives, as input data, an input of the result of processing at an upstream node, performs processing to which the input data are applied, and outputs the result of the processing to a downstream node.

It is possible to efficiently perform large-load processing by connecting a large number of such nodes and causing processing to be performed at each node in a distributed manner.

However, as a result of causing individual processing to be performed at a large number of nodes, there arises a problem of increase in power consumption and processing cost in such a distributed data processing system.

There are also cases where some nodes discontinue processing even during a period in which processing is performed in the entire system. In such a case, a process of inputting data from an upstream node to such a process stop node is discontinued so as to reduce power consumption and processing resources.

As an example of conventional processing for performing such a process, there is processing to be performed by use of a management table. In other words, there is created a management table containing records of the data input/output relationship between nodes and resources to be used by each node. A management unit performs control with reference to the management table such that data input/output between nodes is stopped at various processing timings.

However, in order to perform processing by use of such a management table, it is necessary to accurately grasp the data input/output relationship between a large number of nodes included in a distributed data processing system and a data processing algorithm. Furthermore, there is a problem that in a case where, for example, the algorithm is changed, there arises a need to recreate a new table corresponding to a new algorithm.

For example, as conventional art, Patent Document 1 (Japanese Patent Application Laid-Open No. 2006-344017) discloses a distributed data processing system. Patent Document 1 discloses a system that changes the operation flow of a node according to a user's request or situations.

The configuration disclosed in Patent Document 1 is based on the premise that the operation flow of a node is changed according to a user's request or situations. In order to perform control by use of the management table described above in such a system, it is necessary to also change the management table according to the change of the operation flow.

Furthermore, Patent Document 2 (Japanese Patent Application Laid-Open No. 8-6745) discloses a configuration of a multi-function peripheral that performs a copy process and a printing process as follows: there is set a job management control unit that performs processing control in units of jobs, which are data processing units; and the job management control unit creates a job management table containing records of associations between jobs, and performs processing control with reference to the table.

For example, when a request to stop a single job is input from a user, the job is stopped. In addition, a process of also stopping a job associated with the stopped job is performed with reference to the management table.

In this way, it is possible to efficiently detect and stop related jobs by referring to the job management table. Thus, it is also possible to smoothly perform a process of resuming the jobs.

However, even with this configuration, it is necessary to change the management table in a case where, for example, a change in a processing algorithm and the like occur. This is because related jobs may also change in such a case.

CITATION LIST

Patent Document

Patent Document 1: Japanese Patent Application Laid-Open No. 2006-344017
Patent Document 2: Japanese Patent Application Laid-Open No. 8-6745

SUMMARY OF THE INVENTION

Problems to be Solved by the Invention

An object of the present disclosure is to provide an information processing apparatus and method, an autonomous mobile apparatus and method, and a program that achieve a reduction of power consumption and processing resources by enabling control, such as stopping data input/output between nodes, to be performed according to the state of processing at nodes without using a management table containing records of the data input/output relationship between nodes included in a distributed data processing system.

Solutions to Problems

A first aspect of the present disclosure is an information processing apparatus including:
a data processing unit that performs predetermined processing on data input from an upstream node; and a data output management unit that outputs, to a downstream node, the data on which the predetermined processing has been performed in the data processing unit, and monitors a state of the downstream node, in which the data output management unit controls the data processing unit to stop the data processing in a case of detecting that there is no downstream node using the output data.

Moreover, a second aspect of the present disclosure is an autonomous mobile apparatus including:

a sensor;

a sensor control unit that controls the sensor;

a sensor information analysis unit that receives an input of information output from the sensor, and generates sensor analysis information;

an action plan determination unit that receives an input of the sensor analysis information, and creates an action plan;

a drive control unit that performs drive control according to the action plan; and a drive unit that drives the autonomous mobile apparatus under the control of the drive control unit, in which each of the sensor control unit, the sensor information analysis unit, the action plan determination unit, and the drive control unit includes one or more nodes, and is configured such that data output from an upstream node are input to a downstream node, the one or more nodes being configured to perform node-specific data processing, at least some of the nodes include:

a data processing unit that performs predetermined processing on data input from an upstream node; and a data output management unit that outputs, to a downstream node, the data on which the predetermined processing has been performed in the data processing unit, and monitors a state of the downstream node, and the data output management unit controls the data processing unit to stop the data processing in a case of detecting that there is no downstream node using the output data.

Furthermore, a third aspect of the present disclosure is an information processing method including:

a data processing execution step of performing predetermined processing on data input from an upstream node; and a data output management step of outputting, to a downstream node, the data on which the predetermined processing has been performed, monitoring a state of the downstream node, and performing control such that the data processing is stopped in a case of detecting that there is no downstream node using the output data.

In addition, a fourth aspect of the present disclosure is an autonomous locomotion control method to be performed in an autonomous mobile apparatus, the autonomous mobile apparatus including:

a sensor;

a sensor control unit that controls the sensor;

a sensor information analysis unit that receives an input of information output from the sensor, and generates sensor analysis information;

an action plan determination unit that receives an input of the sensor analysis information, and creates an action plan;

a drive control unit that performs drive control according to the action plan; and a drive unit that drives the autonomous mobile apparatus under the control of the drive control unit, in which each of the sensor control unit, the sensor information analysis unit, the action plan determination unit, and the drive control unit includes one or more nodes, and is configured such that data output from an upstream node are input to a downstream node, the one or more nodes being configured to perform node-specific data processing, and at least some of the nodes perform:

a data processing execution step of causing a data processing unit to perform predetermined processing on data input from an upstream node; and a data output management step of causing a data output management unit to output, to a downstream node, the data on which the predetermined processing has been performed in the data processing unit, monitor a state of the downstream node, and control the data processing unit to stop the data processing in a case of detecting that there is no downstream node using the output data.

Moreover, a fifth aspect of the present disclosure is a program for causing an information processing apparatus to perform information processing by performing:

a data processing execution step of performing predetermined processing on data input from an upstream node; and a data output management step of outputting, to a downstream node, the data on which the predetermined processing has been performed, monitoring a state of the downstream node, and performing control such that the data processing is stopped in a case of detecting that there is no downstream node using the output data.

Note that the program according to the present disclosure is a program that can be provided through, for example, a storage medium or a communication medium to be provided in a computer-readable form to an information processing apparatus or a computer system that can execute various program codes. As a result of providing such a program in a computer-readable form, a process corresponding to the program is implemented on the information processing apparatus or the computer system.

Still other objects, features, and advantages of the present disclosure will be apparent from more detailed descriptions based on embodiments of the present disclosure to be described later and the accompanying drawings. Note that in the present specification, the term "system" refers to a logical set configuration of a plurality of devices, and is not limited to one in which the devices of each configuration are in the same casing.

Effects of the Invention

The configuration of an embodiment of the present disclosure achieves a configuration in which an inter-node data input/output process and node processing are stopped by autonomous control of each node without using a management table. As a result, a reduction of power consumption and a reduction of processing resources are achieved.

Specifically, there are included, for example, a data processing unit and a data output management unit. The data processing unit performs predetermined processing on data input from an upstream node. The data output management unit outputs, to a downstream node, the data on which the predetermined processing has been performed in the data processing unit, and monitors the state of the downstream node. In the case of detecting that there is no downstream node using the output data, the data output management unit controls the data processing unit to stop the data processing. The stop of node processing and inter-node data input/output are performed upstream in a chain manner.

The present configuration achieves a configuration in which an inter-node data input/output process and node processing are stopped by autonomous control of each node without using a management table. As a result, a reduction of power consumption and a reduction of processing resources are achieved.

Note that the effects described in the present specification are merely illustrative and not restrictive, and additional effects may also be achieved.

BRIEF DESCRIPTION OF DRAWINGS

FIG. 2 is a diagram describing an example of a management table to be held by a data processing management unit.

MODE FOR CARRYING OUT THE INVENTION

Details of an information processing apparatus and method, an autonomous mobile apparatus and method, and a program according to the present disclosure will be described below with reference to the drawings. Note that description will be provided in accordance with the following items.

1. Overview of Configuration of General Distributed Data Processing System and Data Input/Output Management Process 2. Overview of Configuration and Processing of Information Processing Apparatus According to Present Disclosure 3. Configuration and Processing of Autonomous Mobile Apparatus 4. Processing Example of Robot or Like That Perform Autonomous Walking 5. Configuration Example of Information Processing Apparatus 6. Summary of Configurations of Present Disclosure

[1. Overview of Configuration of General Distributed Data Processing System and Data Input/Output Management Process]

First, the overview of the configuration of a general distributed data processing system and a data input/output management process will be described with reference to FIG. 1 and the subsequent drawing.

Figure 1:
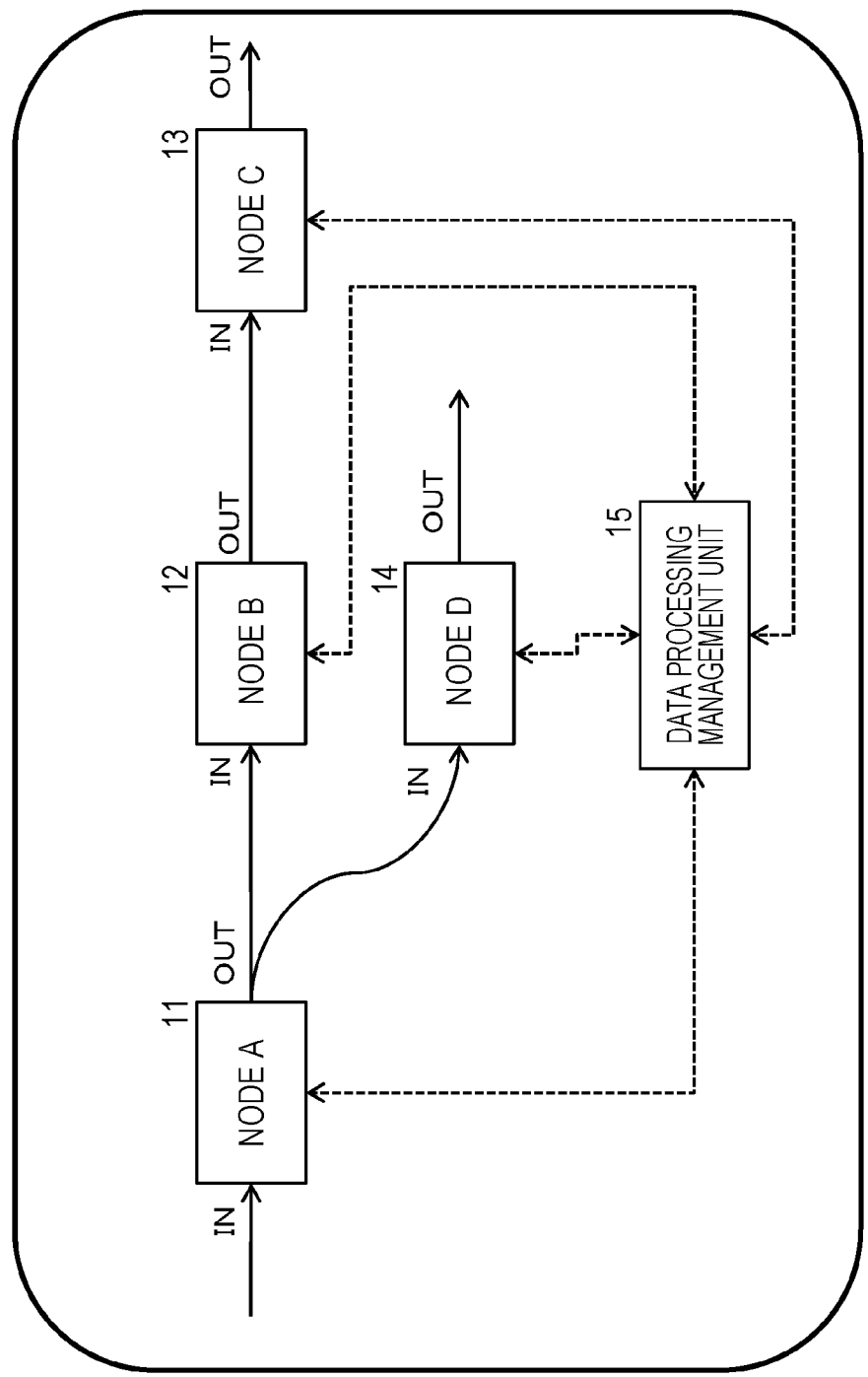
FIG. 1 is a diagram describing a configuration example of a part of a general distributed data processing system.

FIG. 1 is a diagram showing a part of the configuration of a general distributed data processing system.

As described above, the distributed data processing system has a configuration for implementing a large function by connecting two or more so-called nodes which are, for example, small unit functions having an input function and an output function.

FIG. 1 shows an example of a partial configuration of the distributed data processing system, in which some of nodes in the system, that is, four nodes of a node A 11, a node B 12, a node C 13, and a node D 14 are shown.

Note that in the drawing, the flow of data is from left to right, and according to the data flow, a node on the left side is referred to as an upstream node and a node on the right side is referred to as a downstream node.

The node A 11 receives an input of sensor detection information from, for example, a sensor on the left side of the node A or the like. In the drawing, "IN" represents data input to a node, and "OUT" represents data output from a node.

The node A 11 receives an input of sensor detection information from a sensors or the like on the left side of the node A 11, performs data processing based on the input sensor detection information, and outputs a processing result to a downstream node.

In the example shown in FIG. 1, an output from the node A 11 is input to the node B 12 and the node D 14.

The node B 12 performs data processing by using the data input from the node A 11, and outputs a processing result to the node C 13 which is a node located further downstream.

The node D 14 also performs data processing by using the data input from the node A 11, and outputs a processing result to a downstream node or outputs the processing result as a piece of processing result data.

In this way, each node in the distributed data processing system receives, as input data, an input of the result of processing at an upstream node, performs processing to which the input data are applied, and outputs the result of the processing to a downstream node.

It is possible to efficiently perform large-load processing by connecting a large number of such nodes and causing processing to be performed at each node in a distributed manner.

However, as a result of causing individual processing to be performed at a large number of nodes, there arises a problem of increase in power consumption and processing cost in such a distributed data processing system.

There are also cases where some nodes discontinue processing even during a period in which processing is performed in the entire system. In such a case, a process of inputting data from an upstream node to such a process stop node is discontinued so as to reduce power consumption and processing resources.

Conventionally, in order to perform such processing, a data processing management unit 15 is provided as shown in FIG. 1, and the data processing management unit 15 controls processing at each node and an inter-node data input/output process according to the state of processing at each node.

The data processing management unit 15 holds a management table containing records of the data input/output relationship between nodes and resources to be used by each node, and performs control such as stopping data input/output between nodes at various processing timings, with reference to the management table.

FIG. 2 shows an example of a management table held by the data processing management unit 15.

The management table shown in FIG. 2 is a table containing records of the data input/output relationship between nodes.

Output nodes are shown in the leftmost column, and input nodes are shown in the uppermost row.

The data input/output relationship between the nodes can be grasped from the management table, as follows.

Data output from a node A are input to a node B and a node D.

Data output from the node B are input to a node C.

Data output from the node C are not input to any of the nodes A to D.

Data output from the node D are not input to any of the nodes A to D.

The data processing management unit 15 can grasp the data input/output relationship between these nodes from the management table.

Note that an actual distributed data processing system includes a large number of nodes in addition to these nodes. Therefore, the data input/output relationship therebetween is complicated, and the management table contains large data.

Moreover, the data processing management unit 15 also uses a table containing records of information on the relationship between nodes and resources. Examples of the information on the relationship between nodes and resources include information on an input resource for each node, such as information on which sensor information is input to each node, and information on hardware such as a display unit or a hard disk as a storage unit, to which each node outputs data.

In order to perform processing by using such a management table, it is necessary to accurately grasp the data input/output relationship between a large number of nodes included in a distributed data processing system and a data processing algorithm. Thus, there is a problem that in a case where, for example, the algorithm is changed, it is necessary to recreate a new table corresponding to a new algorithm.

[2. Overview of Configuration and Processing of Information Processing Apparatus According to Present Disclosure]

Next, the overview of the configuration and processing of the information processing apparatus according to the present disclosure will be described with reference to FIG. 3 and the subsequent drawings.

The information processing apparatus according to the present disclosure achieves a reduction of power consumption and processing resources by enabling control, such as stopping data input/output between nodes, to be performed according to the state of processing at nodes without using a management table containing records of the data input/output relationship between nodes.

For example, in a case where there is no downstream node that uses data output from a node A, the node A stops a process of generating data to be output from the node A, and also stops data input to the node A. Thus, the entire processing load, that is, processing resources are reduced to achieve power saving.

In a case where there is no downstream node that uses information output from a node, it can be considered that the node does not need to perform processing. Thus, it is also possible to stop the use of input information necessary for generating information to be output from the node.

Each node determines whether or not its own output data are used by any node, and stops data output, data processing, and data input in a case where there is no node that uses the output data. Thus, the stop of data processing at each node and data input/output between nodes is propagated from a downstream node toward an upstream node.

As a result, there is stopped a series of data input/output and node processing of the node series, which is not to be used. Accordingly, unnecessary processing is stopped.

The configuration and processing of the information processing apparatus according to the present disclosure will be described with reference to FIG. 3.

Figure 3:
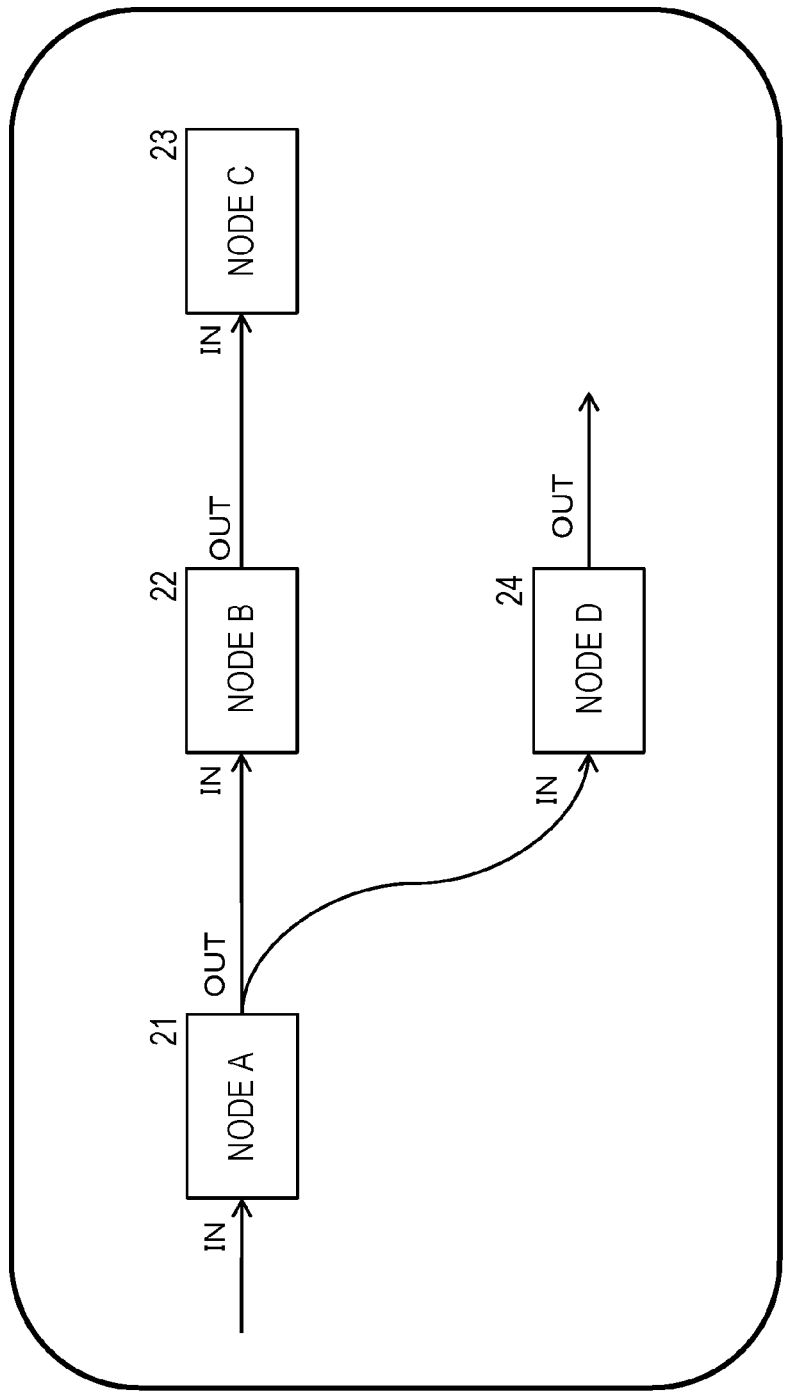
FIG. 3 is a diagram describing a configuration example of an information processing apparatus according to the present disclosure.

The configuration shown in FIG. 3 is an example of the configuration of the information processing apparatus according to the present disclosure. This configuration includes connected nodes which are included in a distributed data processing system similar to that described above with reference to FIG. 1.

However, the configuration shown in FIG. 3 does not include the data processing management unit 15 included in the configuration described above with reference to FIG. 1.

That is, the configuration shown in FIG. 3 is not a configuration for performing processing control according to the management table described above with reference to FIG. 2.

Each node shown in FIG. 3 has the function of determining whether or not its own output data are used by any node, and stopping data output and also stopping data processing at the node and data input from an upstream node to the node in a case where there is no node that uses the output data.

As each node performs this function, the stop of data processing at each node and data input/output between nodes is propagated from a downstream node toward an upstream node.

Four nodes of a node A 21, a node B 22, a node C 23, and a node D 24 are shown in the information processing apparatus shown in FIG. 3.

Note that in the drawing, the flow of data is from left to right, and according to the data flow, a node on the left side is referred to as an upstream node and a node on the right side is referred to as a downstream node.

The node A 21 receives an input of sensor detection information from, for example, a sensor on the left side of the node A or the like. In the drawing, "IN" represents data input to a node, and "OUT" represents data output from a node.

The node A 21 receive an input of sensor detection information from a sensors or the like on the left side of the node A 21, performs data processing based on the input sensor detection information, and output a processing result to a downstream node.

In the example shown in FIG. 3, an output from the node A 21 is input to the node B 22 and the node D 24.

The node B 22 performs data processing by using the data input from the node A 21, and outputs a processing result to the node C 23 which is a node located further downstream.

The node D 24 also performs data processing by using the data input from the node A 21, and outputs a processing result to a downstream node or outputs the processing result as a piece of processing result data.

In this way, each node receives, as input data, an input of the result of processing at an upstream node, performs processing to which the input data are applied, and outputs the result of the processing to a downstream node.

It is possible to efficiently perform large-load processing by connecting a large number of such nodes and causing processing to be performed at each node in a distributed manner.

Each of the node A 21 to the node D 24 shown in FIG. 3 has the function of determining whether or not its own output data are used by any node, and stopping data output and also stopping data processing and data input in a case where there is no node that uses the output data. As each node performs this function, the stop of data processing at each node and data input/output between nodes is propagated from a downstream node toward an upstream node.

A specific processing example will be described with reference to FIG. 4.

Figure 4:
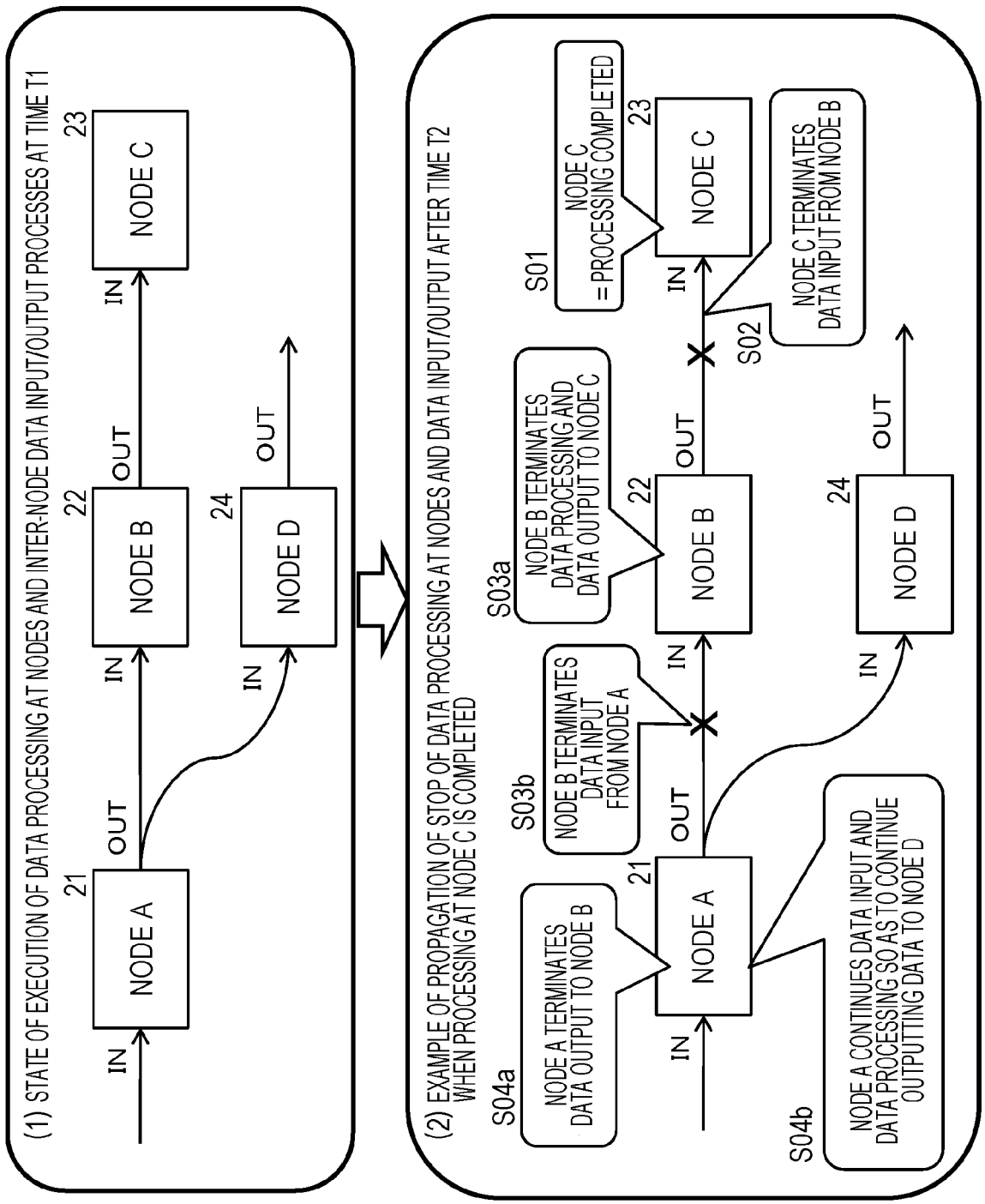
FIG. 4 is a diagram describing examples of performing data processing at nodes and inter-node data input/output processes in the information processing apparatus according to the present disclosure.

FIG. 4 shows each of the following.

(1) The state of execution of data processing at nodes and inter-node data input/output processes at time T1

(2) An example of propagation of the stop of data processing at the nodes and data input/output after time T2 when processing at the node C is completed The state of execution of data processing at nodes and inter-node data input/output processes at time T1 shown in FIG. 4(1) corresponds to the situation described with reference to FIG. 3.

FIG. 4(2) is a diagram describing how a process of stopping data processing at each node and data input/output is propagated. The stopping process is performed in a case where processing at the node C is completed at time T2.

FIG. 4(2) shows processes to be performed after processing at the node C is completed at time T2, in time series from processing step S01 to processing step S04b.

Hereinafter, processing of each step will be described.

(Step S01)

First, in step S01, processing at the node C is completed.

(Step S02)

Upon completion of its own processing in step S01, the node C terminates, in step S02, data input from an upstream node to the node C.

(Step S03a)

Processing of next steps S03a and S03b is performed by the node B that outputs data to the node C.

First, in step S03a, the node B detects that data input has been stopped at the node C to which data output from the node B have been input. In response to the detection, the node B stops its own data processing and data output, that is, data processing at the node B and data output from the node B.

However, in a case where data output from the node B are output to a downstream node other than the node C and data input from the node B is not stopped at the downstream node, the node B continues data processing at the node B and data output to the downstream node receiving input data.

That is, in step S03a, the node B confirms whether or not data output from the node B are input to any other downstream node. Then, only in a case where data output from the node B are not input to any other downstream node, the node B discontinues data processing at the node B, and stops outputting data to all the downstream nodes.

In a case where there is a downstream node to which data output from the node B are input, data processing at the node B is continued, and outputting data is stopped only for a downstream node that has stopped the input. The node B continues to output data to the downstream node to which data output from the node B are input.

Note that the node B can perform the process of detecting that data input to the node C has been stopped, by performing a process of detecting, for example, any of the following states:

(a) detection of disconnection of data input/output connection between the node B and the node C, (b) detection of the stop of data processing at the node C, and (c) detection of interruption of power supply to the node C.

In a case where the node B detects any of the states (a) to (c), the node B determines that data input to the node C has been stopped.

As described above, in a case where there is a downstream node to which data output from an upstream node are input, the upstream node monitors the state of execution/stop of data input to the downstream node.

Note that it is also possible to adopt a configuration in which the downstream node notifies the upstream node that data input has been stopped. In this case, on the basis of the notification from the downstream node that data input has been stopped, the upstream node confirms that data input has been stopped at the downstream node, and performs control such as stopping data output from the own node and stopping data processing.

(Step S03b)

As described above, the node B stops data processing and data output in step S03a.

Next, the node B stops data input from the upstream node in step S03b.

That is, the node B stops data input from the node A.

However, this process of stopping data input is performed only in a case where there is no downstream node to which data output from the node B are input and outputting data from the node B has been completely stopped.

In a case where data output from the node B are input to any downstream node, the node B continues to perform data processing and data input from the upstream node.

(Step S04a)

Processing of next steps S04a and S04b is performed by the node A that outputs data to the node B.

First, in step S04a, the node A detects that data input has been stopped by the node B to which data output from the node A have been input. In response to the detection, the node A stops data output from the node A to the node B.

(Step S04b)

The node A has stopped data output from the node A to the node B in step S04a. Here, the node A confirms whether or not there is any other downstream node to which data output from the node A are input.

As shown in the drawing, data output from the node A are output to the node D, which is a downstream node other than the node B, and data input from the node A has not been stopped by the node D.

In this case, the node A continues to perform data processing at the node A and to output data to the node D that is a downstream node receiving data input.

As described above, each of the node A 21 to the node D 24 determines whether or not its own output data are used by any node, and stops data output, data processing, and data input in a case where there is no node that uses the output data. As each node performs these processes, a series of data input/output and node processing of the node series, which is not to be used, is stopped from the downstream node toward the upstream node. Accordingly, only unnecessary processing is selected and stopped.

As a result of these processes, there are achieved a reduction of resources to be consumed in the entire system and a reduction of power consumption.

Note that it is possible to adopt a configuration in which all the nodes included in the distributed data processing system have the function of performing the above-described processes, that is, the function of determining whether or not its own output data are used by any node and stopping data output, data processing, and data input in a case where there is no node that uses the output data. Meanwhile, it is also possible to adopt a configuration in which only some of the nodes have the above-described function.

For example, the following configuration may be adopted. The above-described function is not provided to a node that is unlikely or less likely to stop node processing. Instead, the function of performing the above-described processes is provided only to a node that is more likely to stop node processing.

Next, a specific process sequence of some of nodes, which perform data input/output, included in the information processing apparatus will be described with reference to a flowchart shown in FIG. 5.

Figure 5:
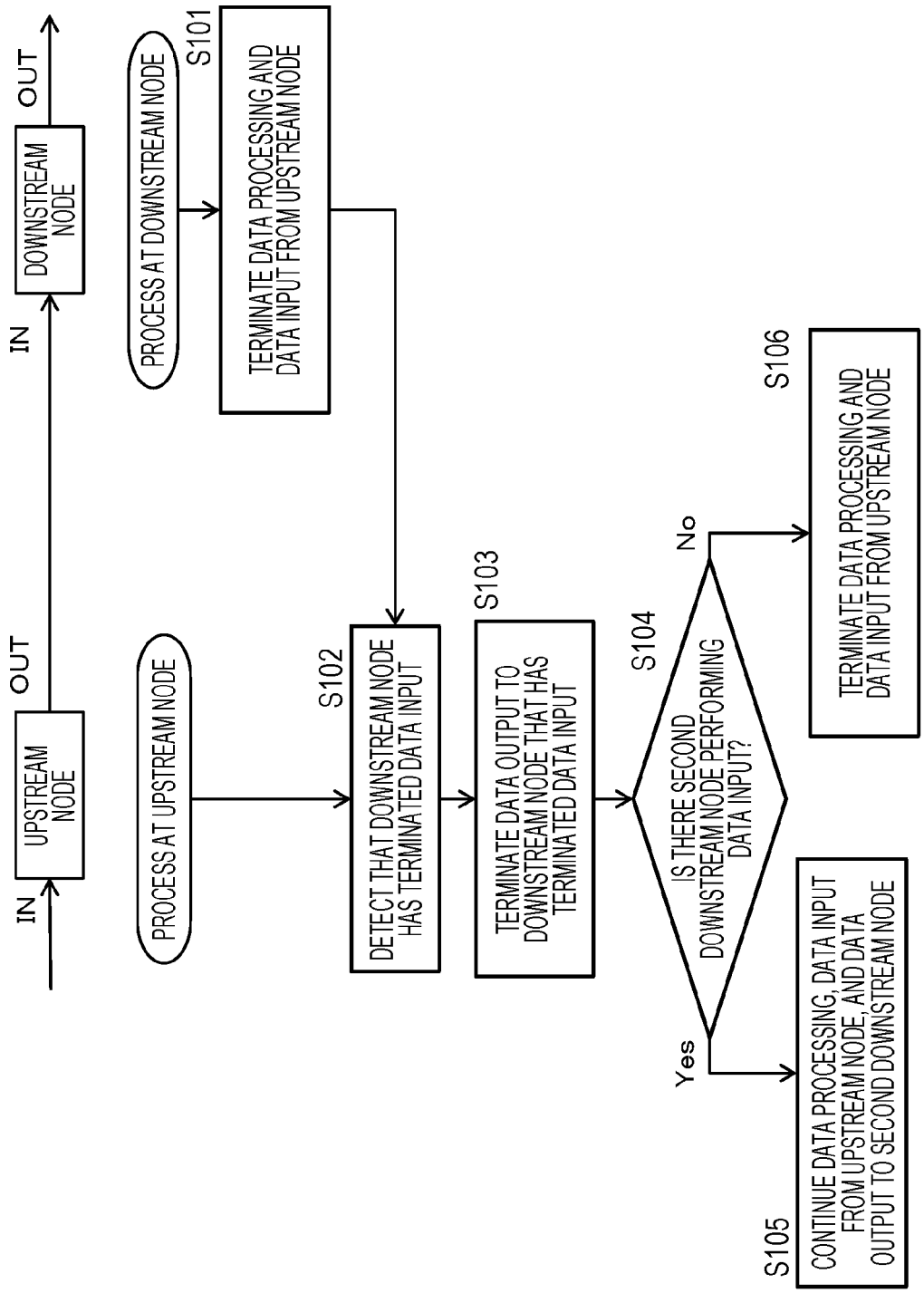
FIG. 5 is a diagram showing a flowchart describing processes of a node pair of one upstream node and one downstream node.

FIG. 5 shows processes of a node pair of one upstream node and one downstream node.

The upstream node shown in the drawing outputs data to the downstream node shown in the drawing.

Shown as steps S102 to S106 are processes to be performed by the upstream node on the basis of this setting in a case where the downstream node stops processing in step S101.

Hereinafter, the detailed process of each of steps S101 to S106 will be described.

(Step S101)

Step S101 is a process to be performed by the downstream node to which data output from the upstream node are input.

First, in step S101, the downstream node terminates processing being performed in the downstream node. Moreover, in accordance with the termination of its own processing, the downstream node terminates data input from the upstream node.

(Step S102)

Processes of next steps S102 to S106 are performed by the upstream node outputting data to the downstream node.

In step S102a, the upstream node first detects that data input has been stopped in the downstream node to which data output from the upstream node have been input.

As described above, the upstream node can perform the process of detecting that data input has been stopped in the downstream node, by performing a process of detecting, for example, any of the following states:

(a) detection of disconnection of data input/output connection between the upstream node and the downstream node, (b) detection of the stop of data processing at the downstream node, and (c) detection of interruption of power supply to the downstream node.

In a case where the upstream node detects any of the states (a) to (c), the upstream node determines that data input to the downstream node has been stopped.

As described above, in a case where there is a downstream node to which data output from an upstream node are input, the upstream node monitors the state of execution/stop of data input to the downstream node.

Note that it is also possible to adopt a configuration in which the downstream node notifies the upstream node that data input has been stopped. In this case, on the basis of the notification from the downstream node that data input has been stopped, the upstream node confirms that data input has been stopped at the downstream node, and performs control such as stopping data output from the own node and stopping data processing.

(Step S103)

Next, in step S103, the upstream node terminates data output to the downstream node that has terminated data input.

(Step S104)

Next, in step S104, the upstream node determines whether or not there is any downstream node continuing data input from the upstream node, among downstream nodes other than the downstream node that has terminated data input.

In a case where such a downstream node exists, the process proceeds to step S105. In a case where such a downstream node does not exist, the process proceeds to step S106.

(Step S105)

In a case where it is determined, in the determination process of step S104, that there is a downstream node continuing data input from the upstream node, the upstream node performs the process of step S105.

In this case, the upstream node continues, in step S105, to perform data processing in the upstream node and data output to the downstream node receiving data input.

Furthermore, the upstream node also continues a data input process in the upstream node.

(Step S106)

Meanwhile, in a case where it is determined, in the determination process of step S104, that there is no downstream node continuing data input from the upstream node, the upstream node performs the process of step S106.

In this case, the upstream node stops data processing in the upstream node, and also stops outputting data to all downstream nodes, in step S106. Moreover, the upstream node also stops the data input process in the upstream node.

The process of stopping the data input process is detected by a node that is located further upstream of the upstream node and is outputting data to the upstream node. Then, processes similar to steps S102 to S106 shown in the drawing are performed at the node.

As described above, the processes shown in FIG. 5 are performed between nodes that perform data input/output, and these processes sequentially propagate toward an upstream node. As each node performs these processes, a series of data input/output and node processing of the node series, which is not to be used, is stopped from the downstream node toward the upstream node. Accordingly, only unnecessary processing is selected and stopped.

As a result of these processes, there are achieved a reduction of resources to be consumed in the entire system and a reduction of power consumption.

[3. Configuration and Processing of Autonomous Mobile Apparatus]

Next, the following describes the configuration and processing of the autonomous mobile apparatus according to the present disclosure.

The autonomous mobile apparatus according to the present disclosure has a configuration for performing distributed data processing, in which connected nodes are included as described above. Each node has the function of performing processes described above with reference to FIGS. 4 and 5.

Figure 6:
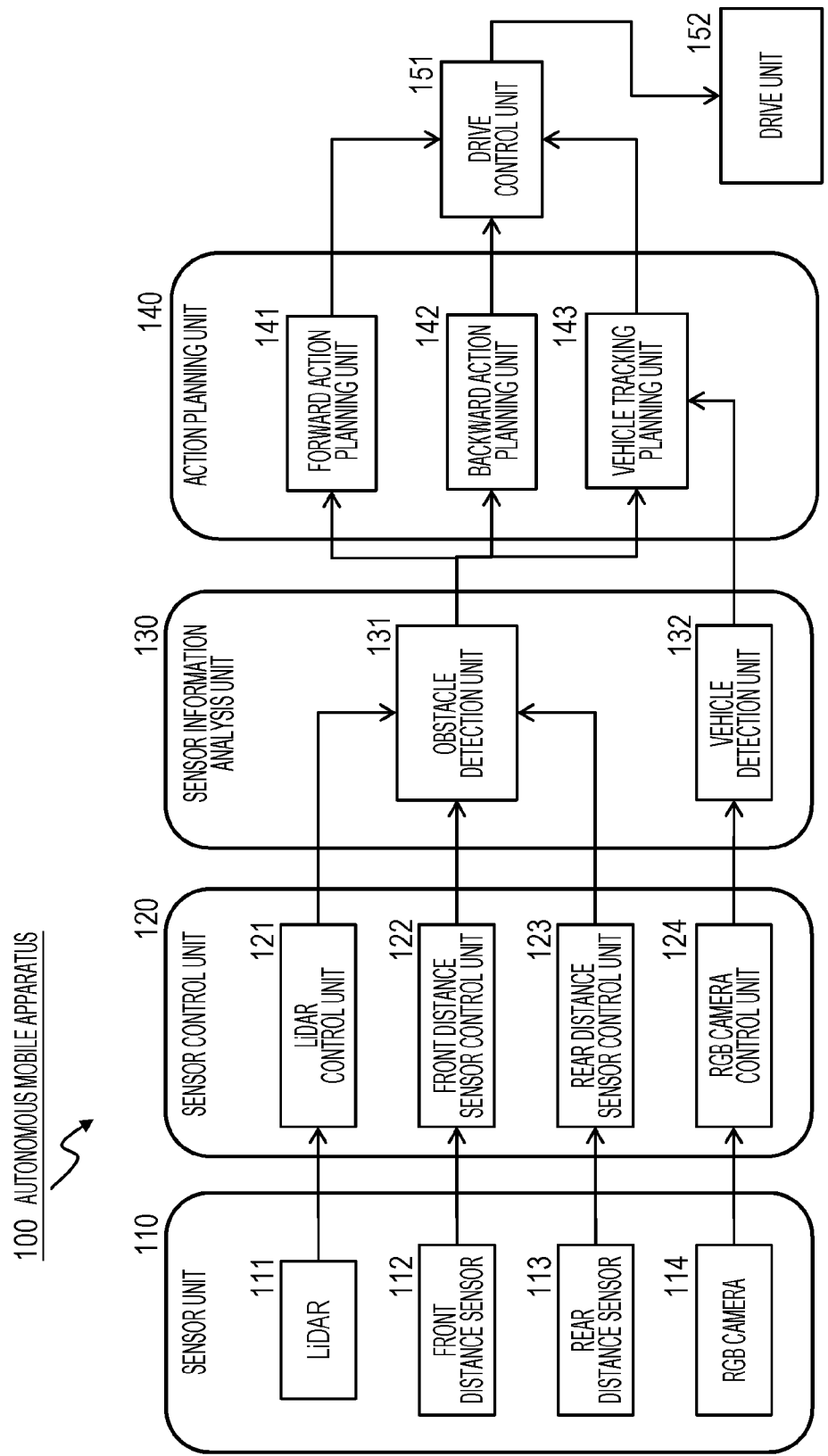
FIG. 6 is a diagram showing a configuration example of an autonomous mobile apparatus according to the present disclosure.

FIG. 6 is a diagram showing a configuration example of an autonomous mobile apparatus 100 according to the present disclosure.

Note that the autonomous mobile apparatus 100 includes an autonomous driving vehicle, a walking robot, or the like. The autonomous driving vehicle, the walking robot, or the like acquires sensor information from various sensors such as a camera and a distance sensor, for example, and uses the acquired sensor information for avoiding an obstacle to travel.

As shown in FIG. 6, the autonomous mobile apparatus 100 includes a sensor unit 110, a sensor control unit 120, a sensor information analysis unit 130, an action plan determination unit 140, a drive control unit 151, and a drive unit 152.

The sensor unit 110 includes various sensors for checking the situation of the surroundings of the autonomous mobile apparatus 100.

As an example, FIG. 6 shows a configuration including a LiDAR 111, a front distance sensor 112, a rear distance sensor 113, and an RGB camera 114.

Note that FIG. 6 shows a configuration example in which four sensors are included, but this is just an example. The number of sensors may be freely determined, and various settings are possible.

Furthermore, with regard to the LiDAR, the camera, the distance sensor, and the like, it is also possible to provide multiple sensors of the same type such as those for front, rear, left and right sides, and the like.

Note that Light Detection and Ranging, Laser Imaging Detection and Ranging (LiDAR) is a device that uses pulsed laser light to acquire surrounding information on the situation of surroundings such as pedestrians, oncoming vehicles, sidewalks, and obstacles, for example.

The sensor control unit 120 controls each sensor included in the sensor unit 110. For example, the sensor control unit 120 performs a process of starting/stopping a sensor information acquisition process, a process of setting a sensing rate, and the like. Moreover, the sensor control unit 120 performs a process of receiving an input of sensor information acquired by each sensor and outputting the sensor information to the sensor information analysis unit 130 in the subsequent stage.

In the example shown in the drawing, the sensor control unit 120 includes the following four control units as control units corresponding to the respective sensors included in the sensor unit 110:

a LiDAR control unit 121, a front distance sensor control unit 122, a rear distance sensor control unit 123, and an RGB camera control unit 124.

The sensor information analysis unit 130 analyzes the sensor information acquired by the sensor control unit 120 from each sensor, and grasps the situation of the surroundings of the autonomous mobile apparatus 100.

As shown in the drawing, the sensor information analysis unit 130 includes an obstacle detection unit 131 and a vehicle detection unit 132. The obstacle detection unit 131 detects an obstacle around the autonomous mobile apparatus 100. The vehicle detection unit 132 detects a vehicle and the like that the autonomous mobile apparatus 100 follows.

The obstacle detection unit 131 receives inputs of sensor information of the LiDAR 111, the front distance sensor 112, and the rear distance sensor 113, and detects obstacles around the autonomous mobile apparatus 100, that is, various obstacles in surroundings, such as vehicles, people, and walls, for example.

The vehicle detection unit 132 receives an input of sensor information of the RGB camera 114, that is, a captured image, and performs a process of detecting a vehicle that the autonomous mobile apparatus 100 follows.

These pieces of detection information are output to the action planning unit 140 in the subsequent stage.

The action planning unit 140 plans the traveling of the autonomous mobile apparatus 100 on the basis of the information on the surroundings of the autonomous mobile apparatus 100 and information on the followed vehicle detected by the sensor information analysis unit 130 in the previous stage.

As shown in the drawing, the action planning unit 140 includes a forward action planning unit 141, a backward action planning unit 142, and a vehicle following planning unit 143.

The forward action planning unit 141 receives an input of information on an obstacle detected by the obstacle detection unit 131 of the sensor information analysis unit 130 in the previous stage, and creates a forward path for moving forward while avoiding the obstacle.

The backward action planning unit 142 receives an input of information on an obstacle detected by the obstacle detection unit 131 of the sensor information analysis unit 130 in the previous stage, and creates a backward path for moving backward while avoiding the obstacle.

The vehicle tracking planning unit 143 receives an input of information on a vehicle to be tracked, detected by the vehicle detection unit 132 of the sensor information analysis unit 130 in the previous stage, and creates a path for following the vehicle to be tracked.

Information on the path created in each processing unit of the action planning unit 140 is output to the drive control unit 151 in the subsequent stage.

The drive control unit 151 controls the drive unit 152 so as to travel and walk according to the travel paths created by the action planning unit 140.

The drive unit 152 includes, for example, a motor for driving a traveling unit (tires and robot feet), an accelerator, a brake, a moving direction control mechanism (steering), and the like.

Constituent elements of the autonomous mobile apparatus 100 shown in FIG. 6, corresponding to the nodes described above with reference to FIG. 4 and the like are as follows:

the LiDAR control unit 121, the front distance sensor control unit 122, the rear distance sensor control unit 123, and the RGB camera control unit 124 of the sensor control unit 120;

the obstacle detection unit 131 and the vehicle detection unit 132 of the sensor information analysis unit 130;

the forward action planning unit 141, the backward action planning unit 142, and the vehicle following planning unit 143 of the action planning unit 140; and the drive control unit 151.

These correspond to the respective nodes.

Each of these nodes performs the function described above with reference to FIGS. 4 and 5.

That is, each node determines whether or not its own output data are used by any node, and stops data output, data processing, and data input in a case where there is no node that uses the output data. As each node performs these processes, a series of data input/output and node processing of the node series, which is not to be used, is stopped from the downstream node toward the upstream node. Accordingly, only unnecessary processing is selected and stopped.

As a result of these processes, there are achieved a reduction of resources to be consumed in the entire system and a reduction of power consumption.

A specific configuration example of the node will be described with reference to FIG. 7.

Figure 7:
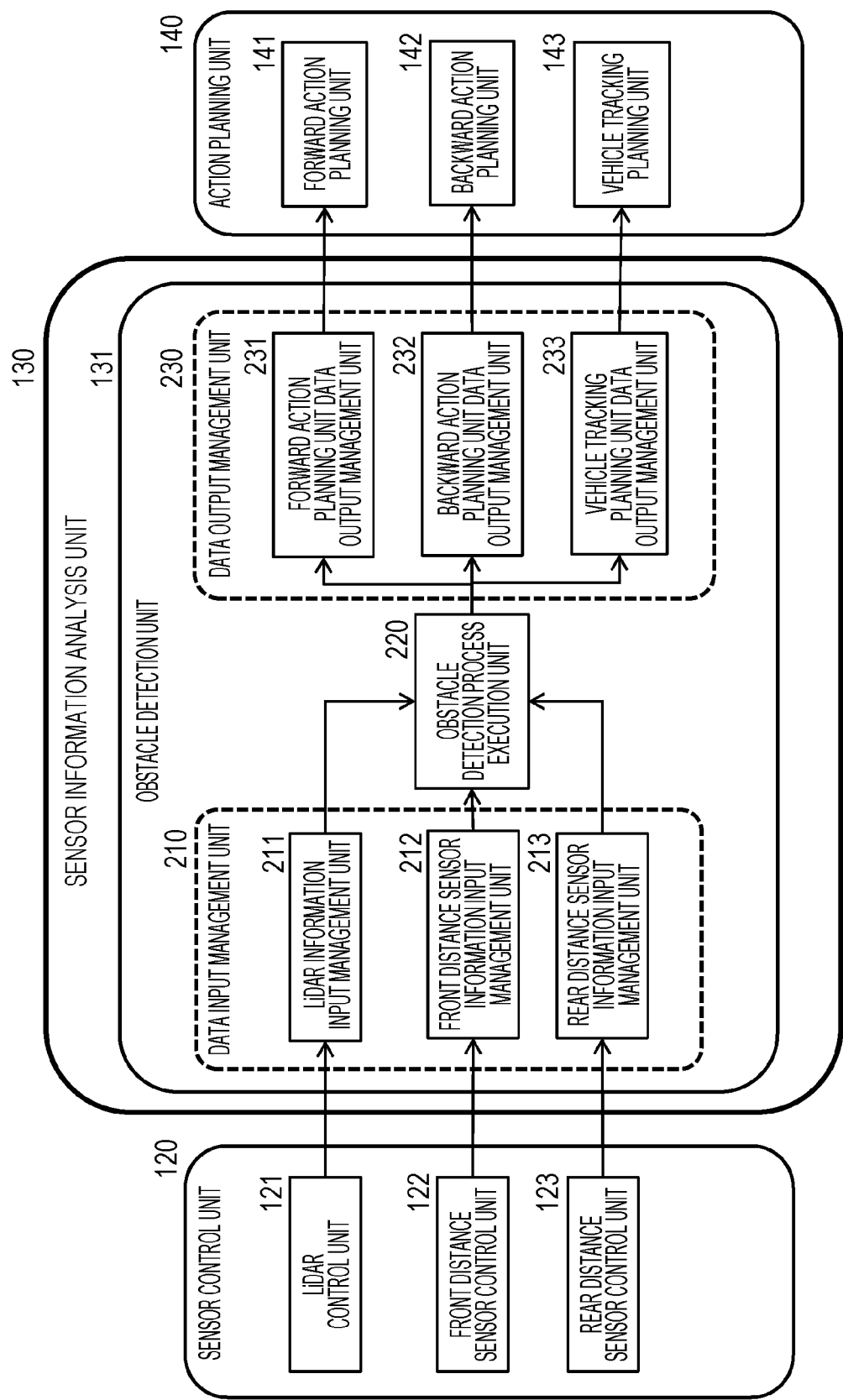
FIG. 7 is a diagram describing a specific configuration example of a node.

FIG. 7 is a diagram showing a specific configuration example of the obstacle detection unit 131 of the sensor information analysis unit 130, which is one of the nodes included in the autonomous mobile apparatus 100 shown in FIG. 6.

As shown in FIG. 7, the obstacle detection unit 131 includes a data input management unit 210, an obstacle detection process execution unit 220, and a data output management unit 230. The obstacle detection process execution unit 220 corresponds to a data processing unit of a node.

The data input management unit 210 includes the following constituent elements:

(a1) a LiDAR information input management unit 211 that manages data input from the LiDAR control unit 121, (a2) a front distance sensor information input management unit 212 that manages data input from the front distance sensor control unit 122, and (a3) a rear distance sensor information input management unit 213 that manages data input from the rear distance sensor control unit 123.

The constituent elements (a1) to (a3) monitor and control data input from the three nodes of the sensor control unit 120 in the previous stage, that is, the LiDAR control unit 121, the front distance sensor control unit 122, and the rear distance sensor control unit 123, respectively.

Specifically, the constituent elements (a1) to (a3) perform control such as inputting data and stopping data input.

The obstacle detection process execution unit 220 receives inputs of sensor information of the LiDAR 111, the front distance sensor 112, and the rear distance sensor 113, and detects obstacles around the autonomous mobile apparatus 100, that is, various obstacles in surroundings, such as vehicles, people, and walls, for example.

Detection result data are output as output data to the action planning unit 140 in the subsequent stage via the data output management unit 230.

The data output management unit 230 performs management of the output data.

The data output management unit 230 includes the following constituent elements:

(b1) a forward action planning unit data output management unit 231 that manages data to be output to the forward action planning unit 141 of the action planning unit 140, (b2) a backward action planning unit data output management unit 232 that manages data to be output to the backward action planning unit 142 of the action planning unit 140, and (b3) a vehicle tracking planning unit data output management unit 233 that manages data to be output to the vehicle tracking planning unit 143 of the action planning unit 140.

The constituent elements (b1) to (b3) monitor and control data to be output to the three nodes of the action planning unit 140 in the subsequent stage, that is, the forward action planning unit 141, the backward action planning unit 142, and the vehicle tracking planning unit 143, respectively.

Specifically, each of the constituent elements (b1) to (b3) monitors whether or not a downstream node is receiving an input of output data, and performs a process of, for example, stopping the output of data to the downstream node and the like in a case where the downstream node has stopped the input of output data.

Note that the process of detecting whether or not a downstream node is receiving an input of output data is performed as a process of detecting, for example, any of the following states:

(1) detection of disconnection of data input/output connection between the own node and the downstream node, (2) detection of the stop of data processing at the downstream node, and (3) detection of interruption of power supply to the downstream node.

Alternatively, the downstream node may perform a process of notifying the upstream node that data input has been stopped, and the upstream node may detect that data input has been stopped at the downstream node, on the basis of the notification.

Output data managed by the constituent elements of the data output management unit 230, that is, the forward action planning unit data output management unit 231, the backward action planning unit data output management unit 232, and the vehicle tracking planning unit data output management unit 233 are input to the three downstream nodes. In a case where all the three downstream nodes have stopped the input of the output data, the obstacle detection unit 131 completely stops outputting data.

As described above, in a case where the obstacle detection unit 131 completely stops outputting data, the obstacle detection process execution unit 220 of the obstacle detection unit 131 stops data processing.

That is, in a case where the data output management unit 130 detects that there is no downstream node that uses the output data, the data output management unit 130 performs control to cause the obstacle detection process execution unit 220, which corresponds to the data processing unit of a node, to stop data processing.

Moreover, when the obstacle detection process execution unit 220 stops data processing, all the constituent elements of the data input management unit 210, that is, all the following information input management units 211 to 213 stop data input from the host node:

(a1) the LiDAR information input management unit 211 that manages data input from the LiDAR control unit 121, (a2) the front distance sensor information input management unit 212 that manages data input from the front distance sensor control unit 122, and (a3) the rear distance sensor information input management unit 213 that manages data input from the rear distance sensor control unit 123.

As a result of this series of processes, the obstacle detection unit 131 stops all of data output, data processing, and the data input process.

Note that any of the constituent elements of the data output management unit 230, that is:

(b1) the forward action planning unit data output management unit 231 that manages data to be output to the forward action planning unit 141 of the action planning unit 140, (b2) the backward action planning unit data output management unit 232 that manages data to be output to the backward action planning unit 142 of the action planning unit 140, and (b3) the vehicle tracking planning unit data output management unit 233 that manages data to be output to the vehicle tracking planning unit 143 of the action planning unit 140.

Assume a case where, among downstream nodes to which output data managed by the data output management units (b1) to (b3) above are input, some downstream nodes have stopped data input and some downstream nodes continue data input. In such a case, there is stopped only outputting data to the downstream nodes that have stopped data input.

In a case where any one of the downstream nodes continues data input, the obstacle detection process execution unit 220 continues to perform data processing, and all the constituent elements of the data input management unit 210, that is, all the following information input management units 211 to 213 continue data input from the host node:

(a1) the LiDAR information input management unit 211 that manages data input from the LiDAR control unit 121, (a2) the front distance sensor information input management unit 212 that manages data input from the front distance sensor control unit 122, and (a3) the rear distance sensor information input management unit 213 that manages data input from the rear distance sensor control unit 123.

FIG. 7 is a diagram showing a specific configuration of the obstacle detection unit 131, which is one of the nodes included in the autonomous mobile apparatus 100 shown in FIG. 6. However, the other nodes also have similar configurations and perform similar processes.

A configuration example of a node included in the information processing apparatus according to the present disclosure will be described with reference to FIG. 8.

Figure 8:
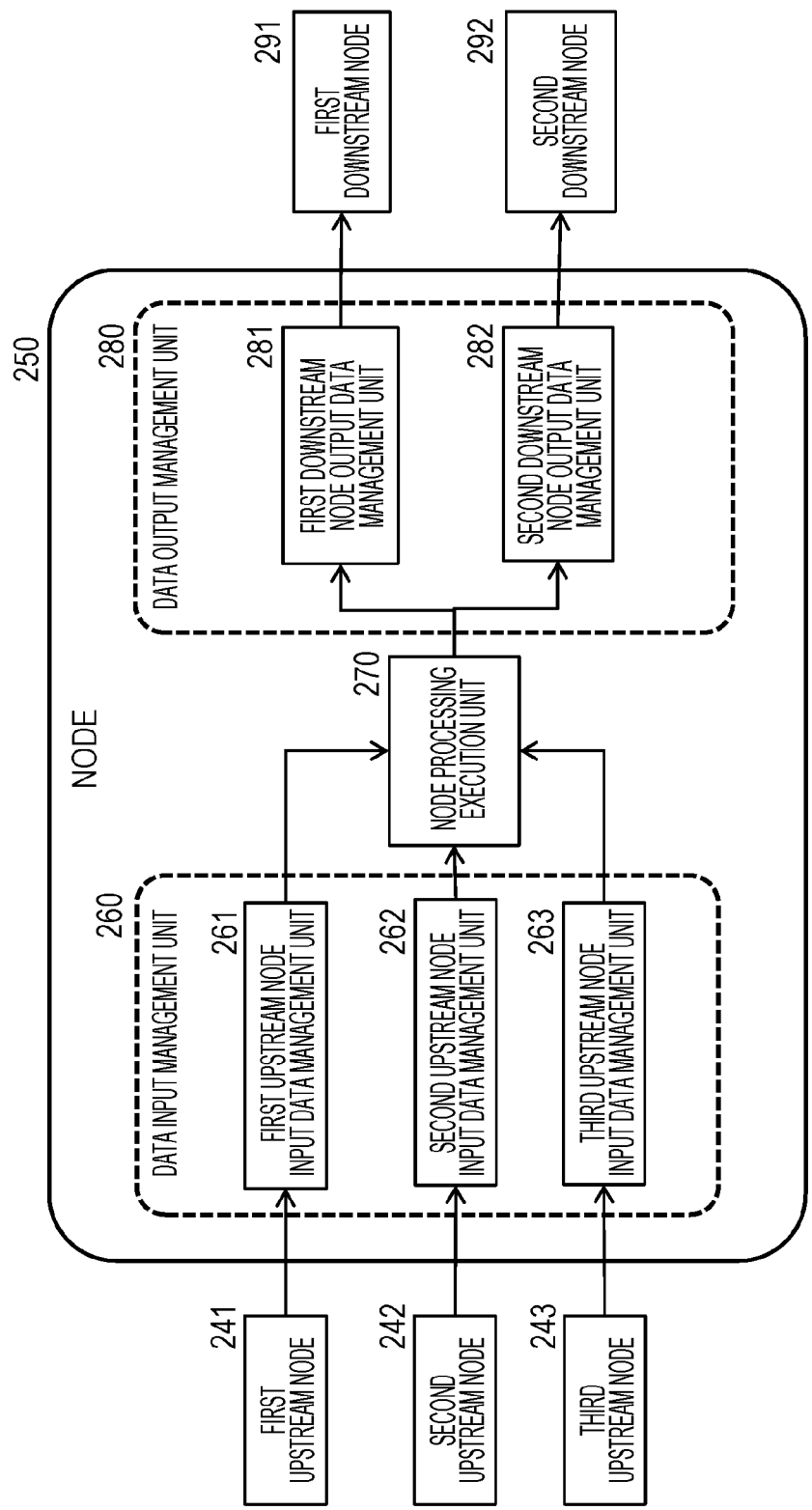
FIG. 8 is a diagram describing a configuration example of a node included in the information processing apparatus according to the present disclosure.

FIG. 8, which shows a node 250, is a diagram showing an example of a typical configuration common to the nodes included in the autonomous mobile apparatus 100 described with reference to FIG. 6.

As shown in FIG. 8, the node 250 includes a data input management unit 260, a node processing execution unit 270, and a data output management unit 280. The node processing execution unit 270 corresponds to the data processing unit of a node.

The data input management unit 260 includes the following constituent elements:

(a1) a first upstream node input data management unit 262 that manages data input from a first upstream node 241, (a2) a second upstream node input data management unit 262 that manages data input from a second upstream node 242, and (a3) a third upstream node input data management unit 263 that manages data input from a third upstream node 243.

The constituent elements (a1) to (a3) monitor and control data input from the three nodes in the previous stage, that is, the first upstream node 241, the second upstream node 242, and the third upstream node 243, respectively.

Specifically, the constituent elements (a1) to (a3) perform control such as inputting data and stopping data input.

The node processing execution unit 270 receives data input from the first upstream node 241, the second upstream node 242, and the third upstream node 243, and performs data processing specific to the node 250.

Data generated as a result of the node processing are output as output data to downstream nodes in the subsequent stage via the data output management unit 280.

The data output management unit 280 performs management of the output data.

The data output management unit 280 includes the following constituent elements:

(b1) a first downstream node output data management unit 281 that manages data to be output to a first downstream node 291, and (b2) a second downstream node output data management unit 282 that manages data to be output to a second downstream node 292.

The constituent elements (b1) and (b2) respectively monitor and control data to be output to the first downstream node 291 and the second downstream node 292 in the subsequent stage.

Specifically, each of the constituent elements (b1) to (b3) monitors whether or not a downstream node is receiving an input of output data, and performs a process of, for example, stopping the output of data to the downstream node and the like in a case where the downstream node has stopped the input of output data.

Output data managed by the constituent elements of the data output management unit 280, that is, the first downstream node output data management unit 281 and the second downstream node output data management unit 282 are input to the two downstream nodes. In a case where both of the two downstream nodes have stopped the input of the output data, the node 250 completely stops outputting data.

As described above, in a case where the node 250 completely stops outputting data, the node processing execution unit 270 stops data processing.

That is, in a case where the data output management unit 280 detects that there is no downstream node that uses the output data, the data output management unit 280 performs control to cause the node processing execution unit 270, which corresponds to the data processing unit of a node, to stop data processing.

Moreover, when the node processing execution unit 270 stops data processing, all the constituent elements of the data input management unit 260, that is, all the following input data management units 261 to 263 stop data input from the host node:

(a1) the first upstream node input data management unit 262 that manages data input from the first upstream node 241, (a2) the second upstream node input data management unit 262 that manages data input from the second upstream node 242, and (a3) the third upstream node input data management unit 263 that manages data input from the third upstream node 243.

As a result of this series of processes, the node 250 stops all of data output, data processing, and the data input process.

Note that any of the constituent elements of the data output management unit 280, that is:

(b1) the first downstream node output data management unit 281 that manages data to be output to the first downstream node 291, and (b2) the second downstream node output data management unit 282 that manages data to be output to the second downstream node 292.

Assume a case where, among downstream nodes to which output data managed by the data output management units (b1) and (b2) above are input, some downstream nodes have stopped data input and some downstream nodes continue data input. In such a case, there is stopped only outputting data to the downstream nodes that have stopped data input.

In a case where any one of the downstream nodes continues data input, the node processing execution unit 270 continues to perform data processing, and all the constituent elements of the data input management unit 260, that is, all the following input data management units 261 to 263 continue data input from the host node:

(a1) the first upstream node input data management unit 262 that manages data input from the first upstream node 241, (a2) the second upstream node input data management unit 262 that manages data input from the second upstream node 242, and (a3) the third upstream node input data management unit 263 that manages data input from the third upstream node 243.

Each of the nodes included in the autonomous mobile apparatus 100 shown in FIG. 6 has a configuration similar to that shown in FIG. 8, and performs the above-described process.

Note that FIG. 8 shows an example of a setting in which the node 250 receives inputs of data output from the three upstream nodes and outputs data to the two downstream nodes. However, various settings are possible in terms of the number of upstream nodes from which data are input and the number of downstream nodes to which data are output.

As described above, each of the nodes included in the autonomous mobile apparatus 100 shown in FIG. 6 determines whether or not its own output data are input to any downstream node, and stops all the processes of outputting data from the own node, performing data processing at the own node, and inputting data to the own node, in a case where its own output data are not input to any downstream node.

As each node performs these processes, a series of data input/output and node processing of the node series, which is not to be used, is stopped from the downstream node toward the upstream node. Accordingly, only unnecessary processing is selected and stopped.

As a result of these processes, there are achieved a reduction of resources to be consumed in the entire system and a reduction of power consumption.

Note that, as described above with reference to FIG. 6, the following constituent elements of the autonomous mobile apparatus 100 shown in FIG. 6 correspond to nodes:

the LiDAR control unit 121, the front distance sensor control unit 122, the rear distance sensor control unit 123, and the RGB camera control unit 124 of the sensor control unit 120;

the obstacle detection unit 131 and the vehicle detection unit of the sensor information analysis unit 130;

the forward action planning unit 141, the backward action planning unit 142, and the vehicle following planning unit 143 of the action planning unit 140; and the drive control unit 151.

These correspond to the respective nodes.

Each of these nodes has the configuration shown in FIG. 8. Each of these nodes determines whether or not its own output data are input to any downstream node, and stops all the processes of outputting data from the own node, performing data processing at the own node, and inputting data to the own node, in a case where its own output data are not input to any downstream node.

Note that the LiDAR control unit 121, the front distance sensor control unit 122, the rear distance sensor control unit 123, and the RGB camera control unit 124 of the sensor control unit 120 control the stop/start of processing by the sensors of the sensor unit 110, that is, the LiDAR 111, the front sensor distance sensor 112, the rear sensor 113, and the RGB camera 114, respectively, among the constituent elements of the autonomous mobile apparatus 100 shown in FIG. 6.

The LiDAR control unit 121, the front distance sensor control unit 122, the rear distance sensor control unit 123, and the RGB camera control unit 124 of the sensor control unit 120 perform processing to be performed by the node shown in FIG. 8. It is possible to configure settings such that in a case where processing at these nodes of the sensor control unit 120 is stopped, processing by sensors that input data to these nodes is also stopped at the same time.

The effect of reducing power consumption can be further increased through these processes.

Next, an example of transition between data processing at each node and an inter-node data input/output process during a specific traveling process of the autonomous mobile apparatus 100 shown in FIG. 6 will be described with reference to FIG. 9 and the subsequent drawings.

Figure 9:
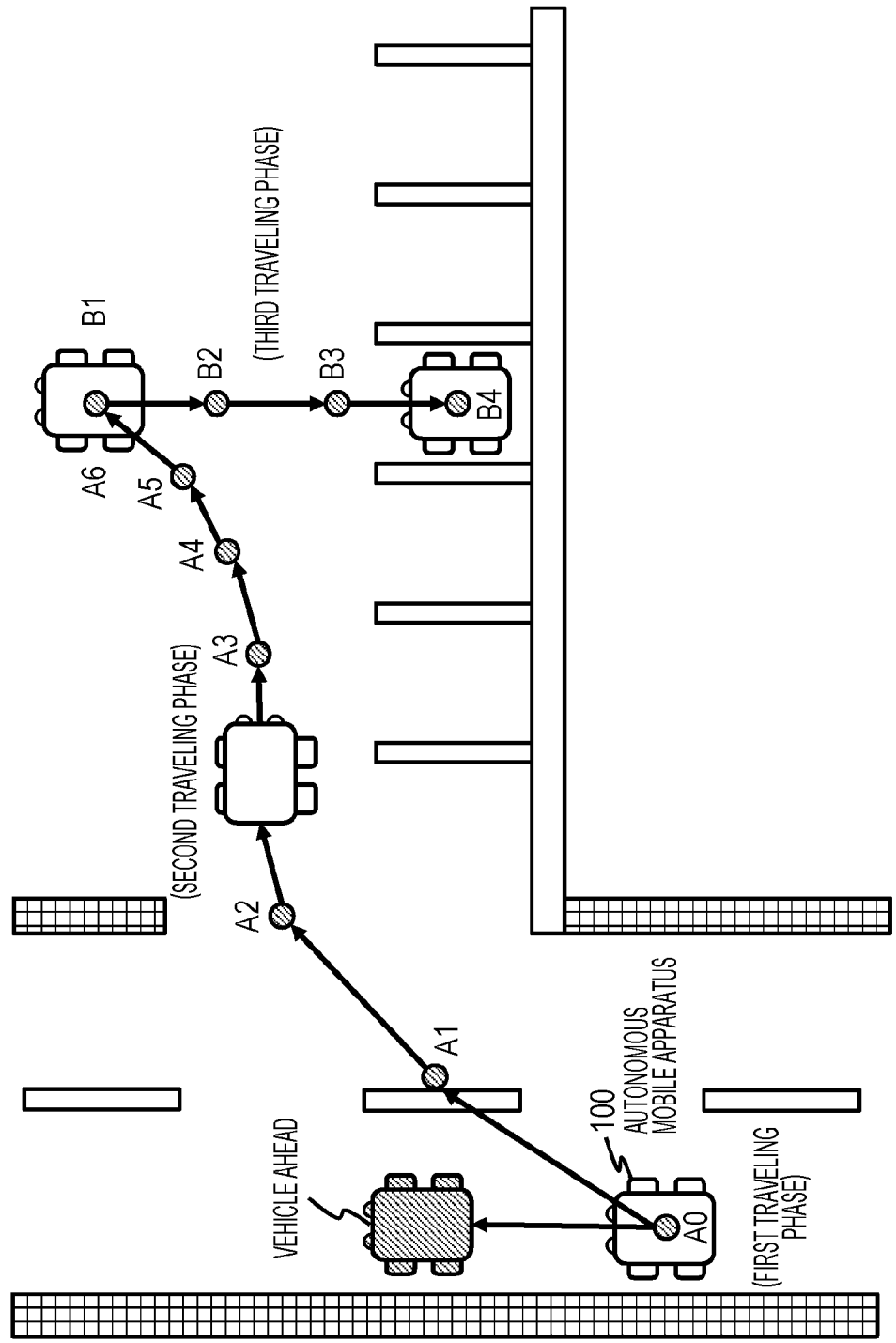
FIG. 9 is a diagram describing an example of transition between data processing at each node and an inter-node data input/output process during a specific traveling process of the autonomous mobile apparatus.

FIG. 9 shows an example of a traveling process in which the autonomous mobile apparatus 100 as an autonomous driving vehicle follows a vehicle ahead while traveling on a road and then parks in a parking lot.

The autonomous mobile apparatus 100 has the configuration including the connected nodes described above with reference to FIG. 6.

The traveling process according to a traveling route shown in FIG. 9 can be divided into the following three traveling phases.

Figure 10:
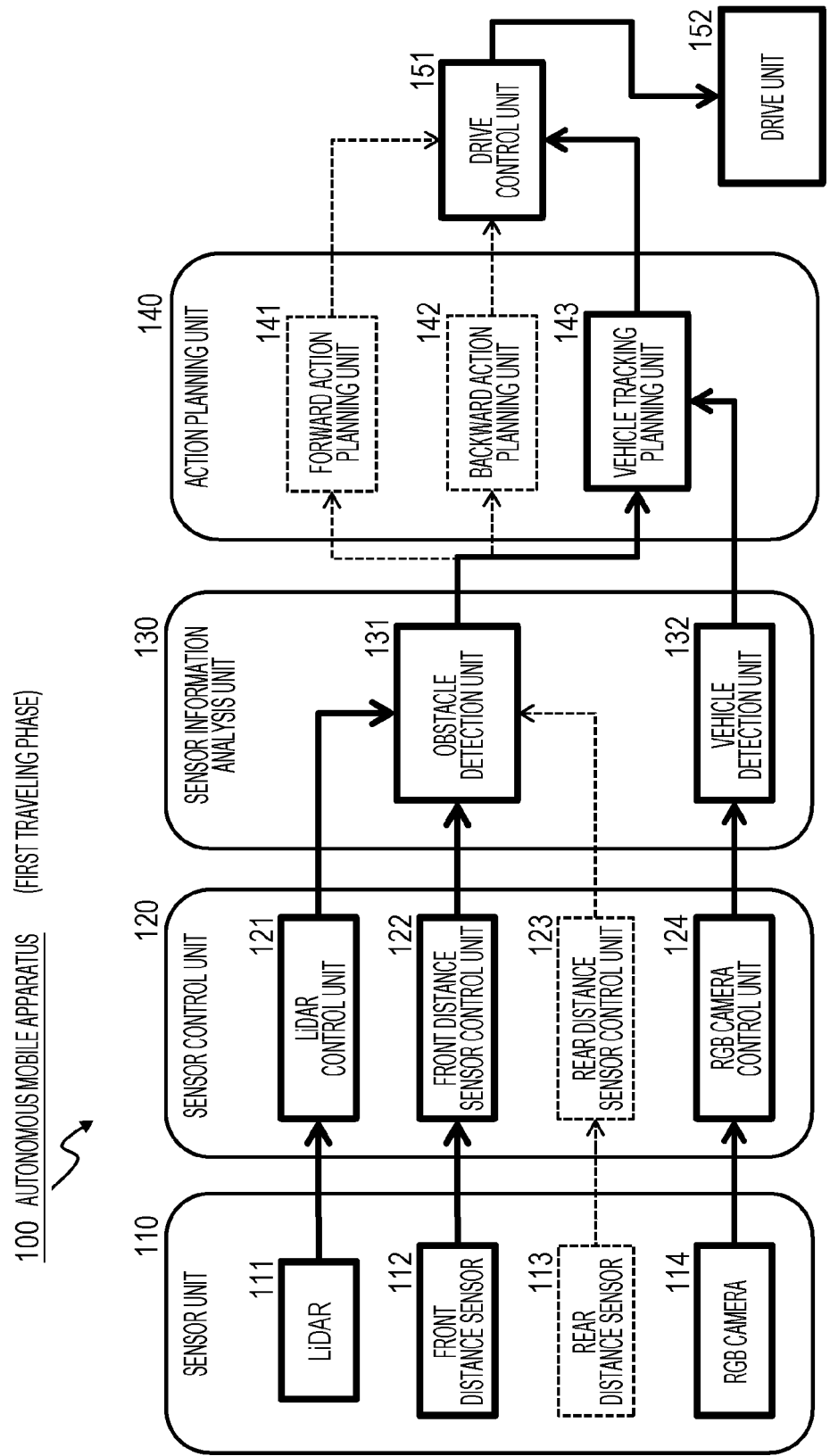
FIG. 10 is a diagram describing process execution nodes, process stop nodes, and the states of execution of data input/output processes in a first traveling phase.
Figure 11:
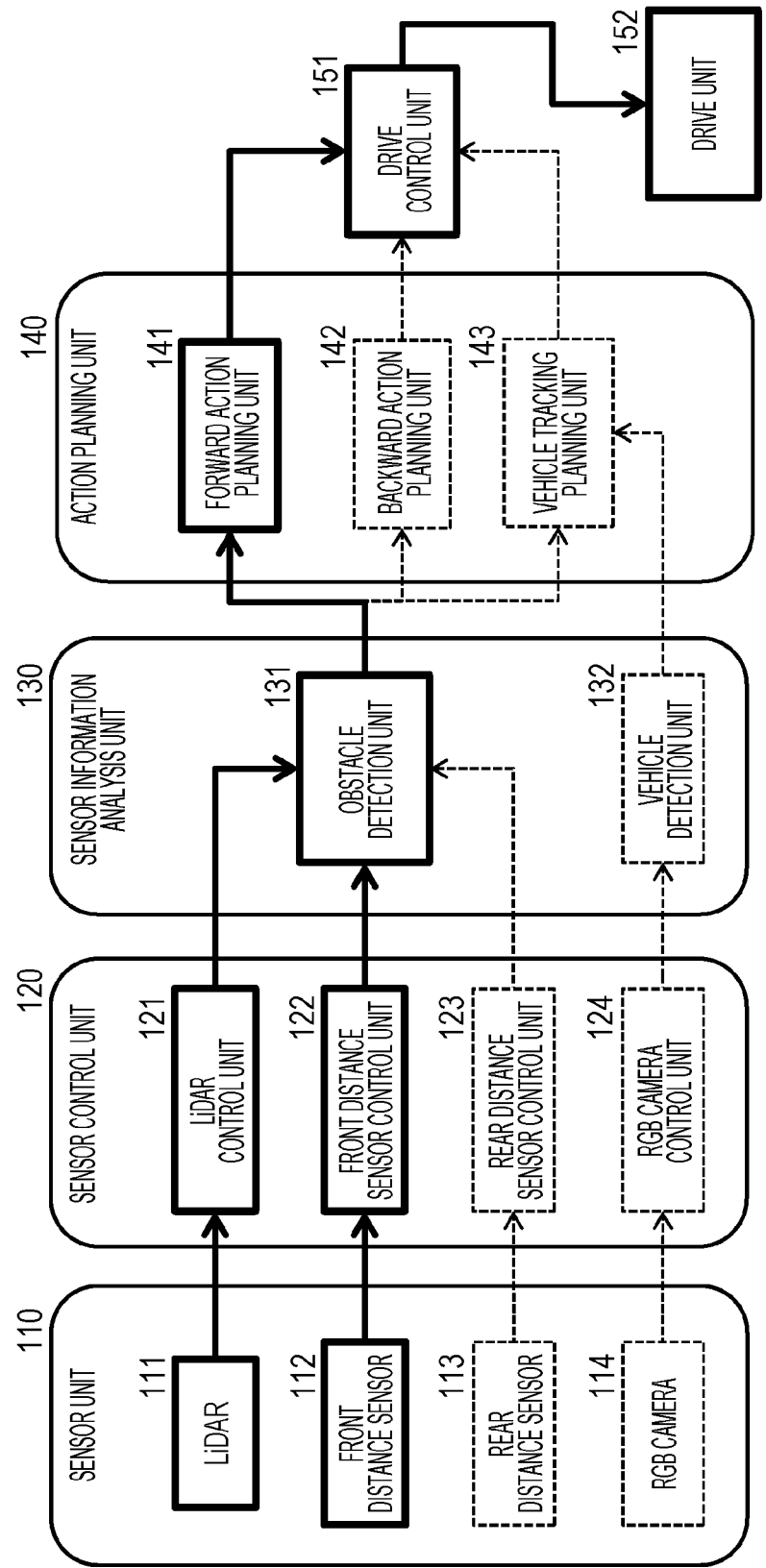
FIG. 11 is a diagram describing process execution nodes, process stop nodes, and the states of execution of data input/output processes in a second traveling phase.
Figure 12:
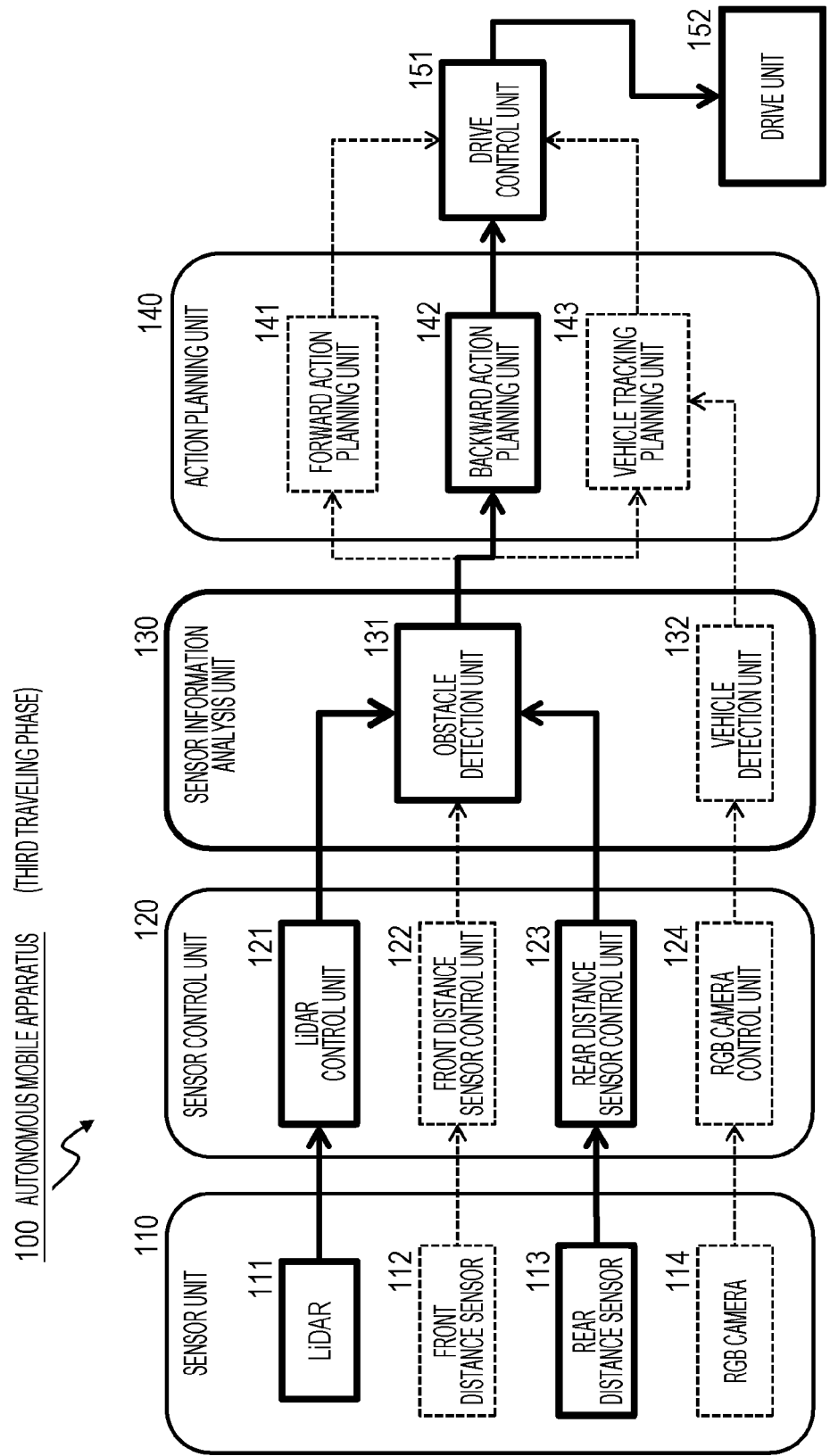
FIG. 12 is a diagram describing process execution nodes, process stop nodes, and the states of execution of data input/output processes in a third traveling phase.

(First traveling phase) a phase (to A0) for following the vehicle ahead while traveling on the road (Second traveling phase) a forward traveling phase (A0 to A6) for stopping following the vehicle ahead, and entering the parking lot (Third traveling phase) a backward traveling phase (B1 to B4) for going backward to a parking position of the parking lot FIGS. 10 to 12 are diagrams showing process execution nodes, process stop nodes, and the states of execution of data input/output processes in the three respective traveling phases described above.

FIG. 10 shows the (first traveling phase), that is, a phase in which the autonomous mobile apparatus 100 shown in FIG. 6 follows the vehicle ahead while traveling on the road, and shows the states of processing at the nodes and the states of data input/output between the nodes in a traveling process to position A0 shown in FIG. 6.

In FIG. 10, nodes, sensors, and the like indicated by bold solid lines are nodes and sensors performing processing.

Nodes, sensors, and the like indicated by dotted lines are nodes and sensors that have stopped processing.

Furthermore, data input/output lines (arrows) indicated by bold solid lines are lines on which data input/output is being performed. In addition, data input/output lines (arrows) indicated by dotted lines are lines, data input/output on which has been stopped.

The first traveling phase corresponds to the traveling process to position A0 shown in FIG. 6, that is, a phase in which the autonomous mobile apparatus 100 shown in FIG. 6 follows the vehicle ahead while traveling on the road.

In this traveling process, the autonomous mobile apparatus 100 follows the leading vehicle ahead while traveling on the road.

That is, the autonomous mobile apparatus 100 travels along a vehicle tracking path created by the vehicle tracking planning unit 143 of the action planning unit 140.

The vehicle tracking planning unit 143 creates a path for tracking the vehicle ahead while avoiding an obstacle located in a traveling direction, that is, located ahead.

For this process, the vehicle tracking planning unit 143 receives inputs of information generated by the obstacle detection unit 131 and the vehicle detection unit 132 of the sensor information analysis unit 130.

The obstacle detection unit 131 of the sensor information analysis unit 130 receives an input of sensor information generated by the LiDAR 111 and the LiDAR control unit 121 located upstream and an input of sensor information generated by the front distance sensor 112 and the front distance sensor control unit 122 located upstream. Thus, the obstacle detection unit 131 detects an obstacle ahead, and outputs detection information to the vehicle tracking planning unit 143.

Furthermore, the vehicle detection unit 132 receives an input of sensor information (=captured image information) generated by the RGB camera 114 and the RGB camera control unit 124 located upstream, detects the vehicle ahead being tracked, and outputs detection information to the vehicle tracking planning unit 143.

These processes are performed in the first traveling phase.

As a result, the nodes, the sensors, and the like indicated by the bold solid lines shown in FIG. 10 are nodes and sensors performing processing in the first traveling phase.

That is, the following sensors and nodes are process execution nodes:

the LiDAR 111, the front distance sensor 112, and the RGB camera 112 of the sensor unit 110;

the LiDAR control unit 121, the front distance sensor control unit 122, and the RGB camera control unit 124 of the sensor control unit 120;

the obstacle detection unit 131 and the vehicle detection unit 132 of the sensor information analysis unit 130; and the vehicle tracking planning unit 143 of the action planning unit 140.

Data input/output lines between these process execution sensors and nodes are data input/output process execution lines.

Processing by the other sensor and nodes is stopped. In addition, data output from the process stop sensor and the process stop nodes and data input to the process stop nodes are also stopped.

Next, a process of the second traveling phase will be described with reference to FIG. 11.

The second traveling phase is a forward traveling phase in which the autonomous mobile apparatus 100 shown in FIG. 6 stops following the vehicle ahead and enters the parking lot. That is, the second traveling phase corresponds to a traveling process from position A0 to position A6 shown in FIG. 6.

FIG. 11 shows the states of processing at the nodes and the states of data input/output between the nodes in the second traveling phase.

In FIG. 11, nodes, sensors, and the like indicated by bold solid lines are nodes and sensors performing processing.

Nodes, sensors, and the like indicated by dotted lines are nodes and sensors that have stopped processing.

Furthermore, data input/output lines (arrows) indicated by bold solid lines are lines on which data input/output is being performed. In addition, data input/output lines (arrows) indicated by dotted lines are lines, data input/output on which has been stopped.

In the second traveling phase, the autonomous mobile apparatus 100 terminates processing by the vehicle tracking planning unit 143 of the action planning unit 140 so as to approach the parking position, and switches the process to processing by the forward action planning unit 141. Thus, the forward action planning unit 141 creates a traveling path.

That is, in the second traveling phase, the autonomous mobile apparatus 100 travels along a path created by the forward action planning unit 141 of the action planning unit 140.

The forward action planning unit 141 creates a path for traveling forward while avoiding an obstacle located in a traveling direction, that is, located ahead.

For this process, the forward action planning unit 141 receives an input of information generated by the obstacle detection unit 131 of the sensor information analysis unit 130.

The obstacle detection unit 131 of the sensor information analysis unit 130 receives an input of the sensor information generated by the LiDAR 111 and the LiDAR control unit 121 located upstream and an input of the sensor information generated by the front distance sensor 112 and the front distance sensor control unit 122 located upstream. Thus, the obstacle detection unit 131 detects an obstacle ahead, and outputs detection information to the forward action planning unit 141.

These processes are performed in the second traveling phase.

As a result, the nodes, the sensors, and the like indicated by the bold solid lines shown in FIG. 11 are nodes and sensors performing processing in the second traveling phase.

That is, the following sensors and nodes are process execution nodes:

the LiDAR 111 and the front distance sensor 112 of the sensor unit 110;

the LiDAR control unit 121 and the front distance sensor control unit 122 of the sensor control unit 120;

the obstacle detection unit 131 of the sensor information analysis unit 130; and the forward action planning unit 141 of the action planning unit 140.

Data input/output lines between these process execution sensors and nodes are data input/output process execution lines.

Processing by the other sensor and nodes is stopped. In addition, data output from the process stop sensor and the process stop nodes and data input to the process stop nodes are also stopped.

Next, a process of the third traveling phase will be described with reference to FIG. 12.

The third traveling phase corresponds to a moving-back process in which the autonomous mobile apparatus 100 shown in FIG. 6 moves to the parking position of the parking lot. That is, the third traveling phase corresponds to a traveling process from position B0 to position B4 shown in FIG. 6. FIG. 12 shows the states of processing at the nodes and the states of data input/output between the nodes in the third traveling phase.

In FIG. 12, nodes, sensors, and the like indicated by bold solid lines are nodes and sensors performing processing.

Nodes, sensors, and the like indicated by dotted lines are nodes and sensors that have stopped processing.

Furthermore, data input/output lines (arrows) indicated by bold solid lines are lines on which data input/output is being performed. In addition, data input/output lines (arrows) indicated by dotted lines are lines, data input/output on which has been stopped.

In the third traveling phase, the autonomous mobile apparatus 100 terminates processing by the forward action planning unit 141 so as to go backward to the parking position, and switches the process to processing by the backward action planning unit 142. Thus, the backward action planning unit 142 creates a traveling path.

That is, in the third traveling phase, the autonomous mobile apparatus 100 travels along a path created by the backward action planning unit 142 of the action planning unit 140.

The backward action planning unit 142 creates a path for traveling backward while avoiding an obstacle located in a traveling direction, that is, located behind.

For this process, the backward action planning unit 142 receives an input of information generated by the obstacle detection unit 131 of the sensor information analysis unit 130.

The obstacle detection unit 131 of the sensor information analysis unit 130 receives an input of the sensor information generated by the LiDAR 111 and the LiDAR control unit 121 located upstream and an input of sensor information generated by the rear distance sensor 113 and the rear distance sensor control unit 123 located upstream. Thus, the obstacle detection unit 131 detects an obstacle behind, and outputs detection information to the backward action planning unit 142.

These processes are performed in the third traveling phase.

As a result, the nodes, the sensors, and the like indicated by the bold solid lines shown in FIG. 12 are nodes and sensors performing processing in the third traveling phase.

That is, the following sensors and nodes are process execution nodes:

the LiDAR 111 and the rear distance sensor 113 of the sensor unit 110;

the LiDAR control unit 121 and the rear distance sensor control unit 123 of the sensor control unit 120;

the obstacle detection unit 131 of the sensor information analysis unit 130; and the backward action planning unit 142 of the action planning unit 140.

Data input/output lines between these process execution sensors and nodes are data input/output process execution lines.

Processing by the other sensor and nodes is stopped. In addition, data output from the process stop sensor and the process stop nodes and data input to the process stop nodes are also stopped.

As described above, the autonomous mobile apparatus 100 selects a processing node to be used, in accordance with various traveling processes, and causes only a process execution node to perform processing. In addition, the autonomous mobile apparatus 100 performs a data input/output process only for data necessary for the process execution node.

Processing and data input/output are stopped at the other stop nodes.

Each node autonomously performs such control.

Performing this process achieves a reduction of power consumption of the entire apparatus and a reduction of processing resources The configuration according to the present disclosure does not require a management table or the like in which a data input/output configuration is described for each node.

A process in which a management table is used requires the management table to be rewritten in a case where a processing algorithm is changed. Meanwhile, the process according to the present disclosure is based on the configuration in which a node autonomously grasps a processing stop state and propagates the stop of processing to an upstream node. Thus, it is not necessary to rewrite the management table.

That is, in the configuration according to the present disclosure, a process is performed on the basis of autonomous determination by a node without referring to the management table. Thus, even in a case where the data input/output relationship between nodes is changed, it is possible to surely stop unnecessary node processing and an unnecessary inter-node data input/output process according to the change.

[4. Processing Example of Robot or Like That Perform Autonomous Walking]

The configuration and processing of an autonomous driving vehicle as an example of an autonomous mobile apparatus have been described with reference to FIGS. 6 to 12.

The autonomous mobile apparatus according to the present disclosure is not limited to such an autonomous driving vehicle, but can also be applied to an autonomous mobile robot that performs autonomous walking such as biped walking or quadruped walking, for example.

The following describes the configuration and processing of an autonomous walking robot which is an embodiment of the autonomous mobile apparatus according to the present disclosure.

Figure 13:
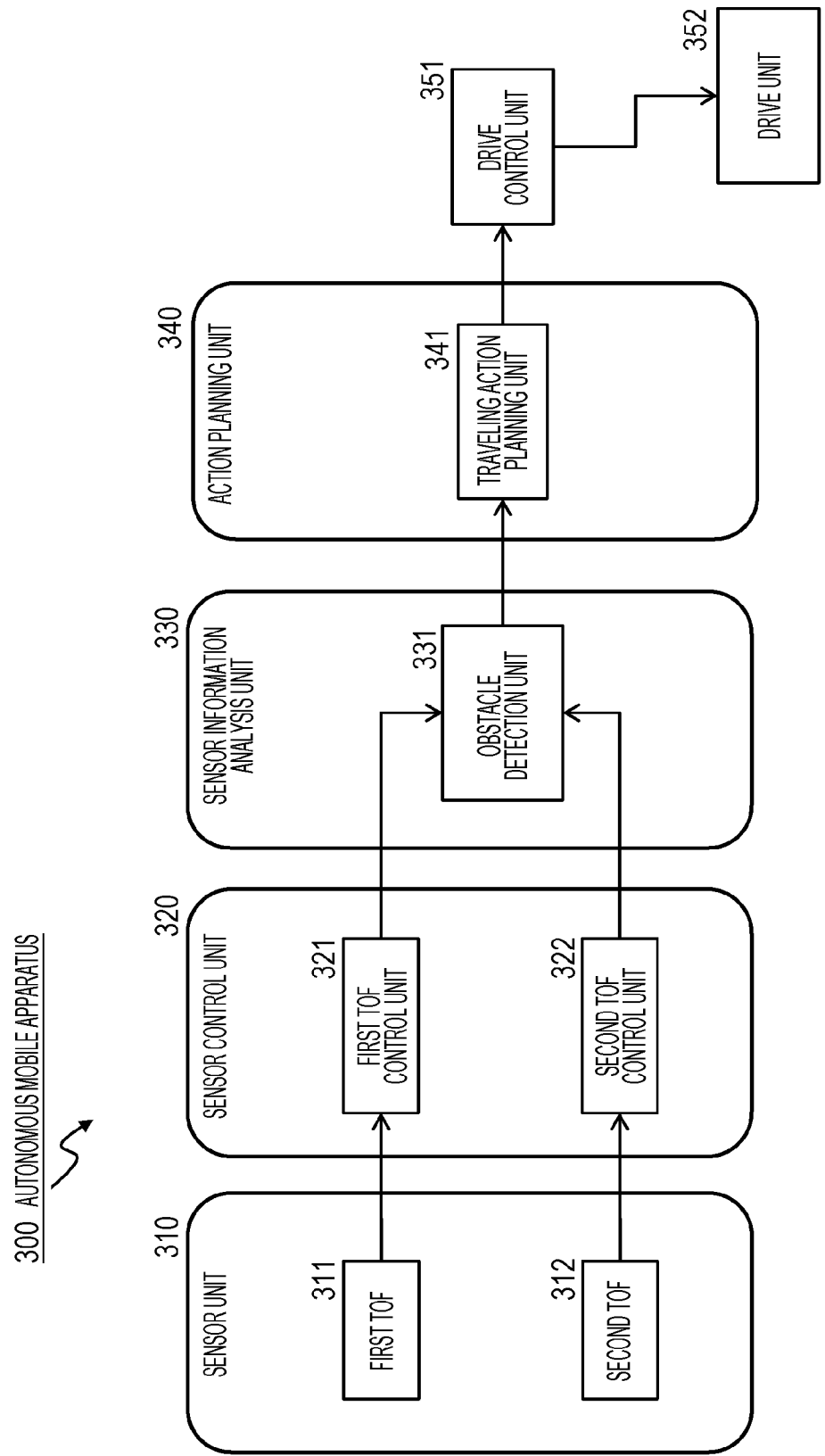
FIG. 13 is a diagram showing a configuration example of the autonomous mobile apparatus according to the present disclosure.

FIG. 13 is a diagram showing a configuration example of an autonomous mobile apparatus 300 corresponding to the autonomous walking robot.

As shown in FIG. 13, the autonomous mobile apparatus 300 includes a sensor unit 310, a sensor control unit 320, a sensor information analysis unit 330, an action plan determination unit 340, a drive control unit 351, and a drive unit 352.

The sensor unit 310 includes a sensor that checks the situation of the surroundings of the autonomous mobile apparatus 300.

As an example, FIG. 13 shows a configuration in which the sensor unit 310 includes a first TOF 311 and a second TOF 312.

Note that Time of Flight (TOF) is a type of distance sensor that calculates a distance to an object in the surroundings by irradiating the object with light and receiving reflected light.

Note that FIG. 13 shows a configuration example in which two TOF sensors are included, but this is just an example. The type and number of sensors may be freely determined, and various settings are possible.

The sensor control unit 320 controls each sensor included in the sensor unit 310. For example, the sensor control unit 320 performs a process of starting/stopping a sensor information acquisition process, a process of setting a sensing rate, and the like. Moreover, the sensor control unit 320 performs a process of receiving an input of sensor information acquired by each sensor and outputting the sensor information to the sensor information analysis unit 330 in the subsequent stage.

In the example shown in the drawing, the sensor control unit 320 includes the following two control units as control units corresponding to the respective sensors included in the sensor unit 310:

a first TOF control unit 321 and a second TOF control unit 322.

The sensor information analysis unit 330 analyzes the sensor information acquired by the sensor control unit 320 from each sensor, and grasps the situation of the surroundings of the autonomous mobile apparatus 300.

As shown in the drawing, the sensor information analysis unit 330 includes an obstacle detection unit 331 that detects an obstacle around the autonomous mobile apparatus 300.

The obstacle detection unit 331 receives inputs of sensor information of the first TOF 311 and the second TOF 312, and detects obstacles around the autonomous mobile apparatus 300, that is, various obstacles in surroundings, such as objects, people, and walls, for example.

This detection information is output to the action planning unit 340 in the subsequent stage.

The action planning unit 340 plans the traveling of the autonomous mobile apparatus 300 on the basis of the information on the surroundings of the autonomous mobile apparatus 300 detected by the sensor information analysis unit 330 in the previous stage.

As shown in the drawing, the action planning unit 340 includes a traveling action planning unit 341.

The traveling action planning unit 341 receives an input of information on an obstacle detected by the obstacle detection unit 331 of the sensor information analysis unit 330 in the previous stage, and creates a path for traveling while avoiding the obstacle.

Information on the path created in the action planning unit 340 is output to the drive control unit 351 in the subsequent stage.

The drive control unit 351 controls the drive unit 352 so as to travel and walk according to the travel path created by the action planning unit 340.

The drive unit 352 includes, for example, a motor for driving a walking unit (robot feet and the like), a moving direction control mechanism, and the like.

Note that constituent elements of the autonomous mobile apparatus 300 shown in FIG. 13, corresponding to the nodes described above with reference to FIG. 8 and the like, are as follows:

the first TOF control unit 321 and the second TOF control unit 322 of the sensor control unit 320;

the obstacle detection unit 331 of the sensor information analysis unit 330;

the traveling action planning unit 341 of the action planning unit 340; and the drive control unit 351.

These correspond to the respective nodes.

Each of these nodes has a configuration similar to that described above with reference to FIG. 8.

That is, each node determines whether or not its own output data are used by any node, and stops data output, data processing, and data input in a case where there is no node that uses the output data. As each node performs these processes, a series of data input/output and node processing of the node series, which is not to be used, is stopped from the downstream node toward the upstream node. Accordingly, only unnecessary processing is selected and stopped.

As a result of these processes, there are achieved a reduction of resources to be consumed in the entire system and a reduction of power consumption.

Note that the first TOF control unit 321 and the second TOF control unit 322 of the sensor control unit 320 control the stop/start of processing by the sensors of the sensor unit 310, that is, the first TOF 311 and the second TOF 312, respectively, among the constituent elements of the autonomous mobile apparatus 300 shown in FIG. 13.

It is possible to configure settings such that in a case where the first TOF control unit 321 and the second TOF control unit 322 of the sensor control unit 320 stop processing by the own nodes, processing by sensors that input data to the nodes are also stopped at the same time.

The effect of reducing power consumption can be further increased through these processes.

[5. Configuration Example of Information Processing Apparatus]

Next, a specific hardware configuration example of an information processing apparatus included in the autonomous mobile apparatus will be described with reference to FIG. 14.

The autonomous mobile apparatuses described above with reference to FIGS. 6 and 13 each include the sensors, the sensor control unit, the sensor information analysis unit, the action plan determination unit, the drive control unit, and the drive unit.

Of these processing units, the sensor control unit, the sensor information analysis unit, the action plan determination unit, and the drive control unit each include one or more nodes having the configuration described above with reference to FIG. 8.

Each of these nodes performs data processing specific to the node.

Each node can be configured as separate hardware. Alternatively, it is also possible to adopt a configuration in which the functions of a plurality of nodes are performed by use of a single piece of hardware.

Figure 14:
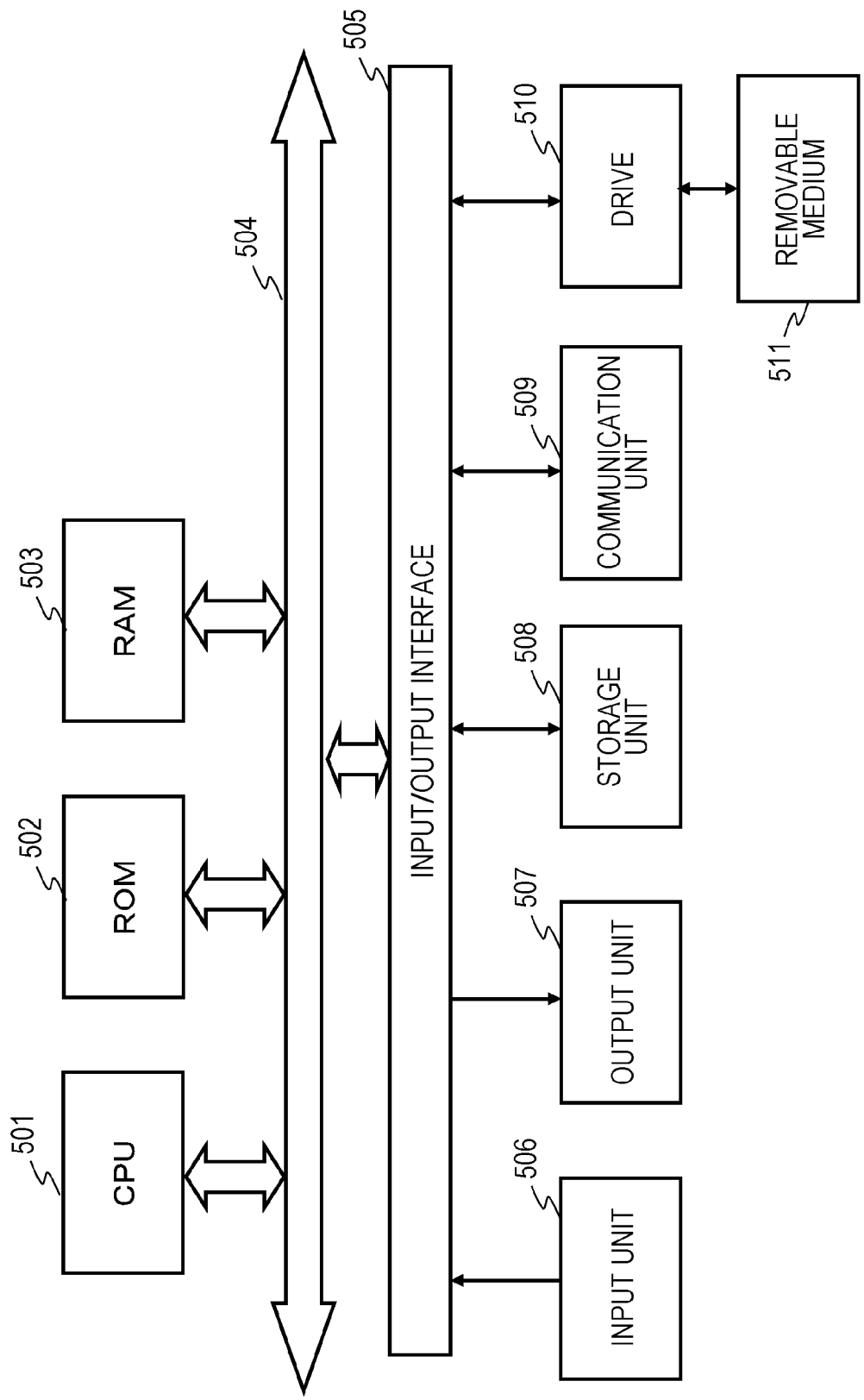
FIG. 14 is a diagram describing a hardware configuration example of a node of the autonomous mobile apparatus.

The following describes a configuration example of hardware included in a node with reference to FIG. 14.

FIG. 14 is a diagram showing an example of the positional configuration of hardware included in a node.

A central processing unit (CPU) 501 functions as a data processing unit that performs various types of processing according to programs stored in a read only memory (ROM) 502 or a storage unit 508. For example, the CPU 501 performs processing according to the sequence described in the above-described embodiment. A random access memory (RAM) 503 stores, for example, programs to be executed by the CPU 501, data, and the like. The CPU 501, the ROM 502, and the RAM 503 are connected to each other by a bus 504.

The CPU 501 is connected to an input/output interface 505 via the bus 504. The input/output interface 505 is connected to an input unit 506 and an output unit 507. The input unit 506 includes, for example, various switches, a keyboard, a touch panel, a mouse, and a microphone, and also includes a state data acquisition unit such as a sensor, a camera, a GPS, or the like. The output unit 507 includes a display, a speaker, and the like.

The CPU 501 receives commands, state data, and the like input from the input unit 506, performs various types of processing, and outputs processing results to, for example, the output unit 507.

The storage unit 508 connected to the input/output interface 505 includes, for example, a hard disk and the like, and stores programs to be executed by the CPU 501 and various data. A communication unit 509 functions as a transmission/reception unit for data communication via a network such as the Internet or a local area network, and communicates with an external device.

A drive 150 connected to the input/output interface 505 drives a removable medium 511 to perform the recording or reading of data. Examples of the removable medium 511 include a magnetic disk, an optical disk, a magneto-optical disk, a semiconductor memory such as a memory card, and the like.

Note that the hardware configuration example shown in FIG. 14 is just an example, and each node can include various types of hardware according to a function to be performed by the node.

[6. Summary of Configurations of Present Disclosure]

The embodiments of the present disclosure have been described above in detail with reference to specific examples. However, it is obvious that those skilled in the art can make modifications and substitutions of the embodiments without departing from the gist of the present disclosure. In other words, the present invention has been disclosed in the form of exemplification, and should not be restrictively interpreted. In order to judge the gist of the present disclosure, the section "CLAIMS" should be taken into consideration.

Note that the technology disclosed in the present specification can adopt the following configurations.

(1) An information processing apparatus including:
a data processing unit that performs predetermined processing on data input from an upstream node; and
a data output management unit that outputs, to a downstream node, the data on which the predetermined processing has been performed in the data processing unit, and monitors a state of the downstream node,
in which the data output management unit controls the data processing unit to stop the data processing in a case of detecting that there is no downstream node using the output data.

(2) The information processing apparatus according to (1), in which
in a case of detecting that there are two types of downstream nodes which are a downstream node that has stopped using the output data and a downstream node continuing to use the output data, the data output management unit stops outputting data to the downstream node that has stopped using the output data, and
the information processing apparatus continues the data processing in the data processing unit and data input from the upstream node.

(3) The information processing apparatus according to (1) or (2), in which
data processing at nodes and an inter-node data input/output process are stopped in a chain manner from the downstream node toward the upstream node.

(4) The information processing apparatus according to any one of (1) to (3), in which
the data output management unit determines that a downstream node has stopped using the output data, in a case where any of (a) to (c) below is detected:
(a) detection of disconnection of data input/output connection with the downstream node;
(b) detection of a stop of data processing at the downstream node; and
(c) detection of interruption of power supply to the downstream node.

(5) The information processing apparatus according to any one of (1) to (4), in which
the data output management unit determines that a downstream node has stopped using the output data, on the basis of a notification of a stop of data input, received from the downstream node.

(6) The information processing apparatus according to any one of (1) to (5), further including:
a data input management unit that controls execution and a stop of data input from the upstream node.

(7) The information processing apparatus according to (6), in which
the data input management unit controls execution and a stop of data input from each of a plurality of different upstream nodes.

(8) The information processing apparatus according to (1), in which
the data output management unit controls execution and a stop of data output to each of a plurality of different downstream nodes.

(9) An autonomous mobile apparatus including:
a sensor;
a sensor control unit that controls the sensor;
a sensor information analysis unit that receives an input of information output from the sensor, and generates sensor analysis information;
an action plan determination unit that receives an input of the sensor analysis information, and creates an action plan;
a drive control unit that performs drive control according to the action plan; and
a drive unit that drives the autonomous mobile apparatus under the control of the drive control unit,
in which each of the sensor control unit, the sensor information analysis unit, the action plan determination unit, and the drive control unit includes one or more nodes, and is configured such that data output from an upstream node are input to a downstream node, the one or more nodes being configured to perform node-specific data processing,
at least some of the nodes include:
a data processing unit that performs predetermined processing on data input from an upstream node; and
a data output management unit that outputs, to a downstream node, the data on which the predetermined processing has been performed in the data processing unit, and monitors a state of the downstream node, and
the data output management unit controls the data processing unit to stop the data processing in a case of detecting that there is no downstream node using the output data.

(10) The autonomous mobile apparatus according to (9), in which
in a case of detecting that there are two types of downstream nodes which are a downstream node that has stopped using the output data and a downstream node continuing to use the output data, the data output management unit stops outputting data to the downstream node that has stopped using the output data, and
the autonomous mobile apparatus continues the data processing in the data processing unit and data input from the upstream node.

(11) The autonomous mobile apparatus according to (9) or (10), in which
data processing at nodes and an inter-node data input/output process are stopped in a chain manner from the downstream node toward the upstream node.

(12) The autonomous mobile apparatus according to any one of (9) to (11), in which
the node included in the sensor control unit also stops a sensor to be controlled, along with the stop of the processing in the data processing unit.

(13) The autonomous mobile apparatus according to any one of (9) to (12), in which
the drive unit includes at least one of a motor, an accelerator, a brake, or a moving direction control mechanism.

(14) An information processing method including:
a data processing execution step of performing predetermined processing on data input from an upstream node; and
a data output management step of outputting, to a downstream node, the data on which the predetermined processing has been performed, monitoring a state of the downstream node, and performing control such that the data processing is stopped in a case of detecting that there is no downstream node using the output data.

(15) An autonomous locomotion control method to be performed in an autonomous mobile apparatus, the autonomous mobile apparatus including:
a sensor;
a sensor control unit that controls the sensor;
a sensor information analysis unit that receives an input of information output from the sensor, and generates sensor analysis information;
an action plan determination unit that receives an input of the sensor analysis information, and creates an action plan;
a drive control unit that performs drive control according to the action plan; and a drive unit that drives the autonomous mobile apparatus under the control of the drive control unit, in which each of the sensor control unit, the sensor information analysis unit, the action plan determination unit, and the drive control unit includes one or more nodes, and is configured such that data output from an upstream node are input to a downstream node, the one or more nodes being configured to perform node-specific data processing, and at least some of the nodes perform:

a data processing execution step of causing a data processing unit to perform predetermined processing on data input from an upstream node; and a data output management step of causing a data output management unit to output, to a downstream node, the data on which the predetermined processing has been performed in the data processing unit, monitor a state of the downstream node, and control the data processing unit to stop the data processing in a case of detecting that there is no downstream node using the output data.

(16) A program for causing an information processing apparatus to perform information processing by performing:

a data processing execution step of performing predetermined processing on data input from an upstream node; and a data output management step of outputting, to a downstream node, the data on which the predetermined processing has been performed, monitoring a state of the downstream node, and performing control such that the data processing is stopped in a case of detecting that there is no downstream node using the output data.

Furthermore, the series of processes described in the specification can be implemented by hardware, software, or a configuration in which hardware and software are combined. In a case where the processes are implemented by software, it is possible to execute a program in which a process sequence has been recorded, after installing the program in a memory in a computer incorporated in dedicated hardware or installing the program on a general-purpose computer capable of performing various types of processing. For example, the program can be recorded in advance on a recording medium. In addition to being installed on a computer from the recording medium, the program can be received via a network such as a local area network (LAN) or the Internet and installed on a recording medium such as a built-in hard disk.

Note that the various processes described in the specification may be performed not only in time series according to the description, but also in parallel or separately depending on the processing capacity of an apparatus that performs the processes or depending on the needs. Furthermore, in the present specification, the term "system" refers to a logical set configuration of a plurality of devices, and is not limited to one in which the devices of each configuration are in the same casing.

INDUSTRIAL APPLICABILITY

As described above, the configuration of an embodiment of the present disclosure achieves a configuration in which an inter-node data input/output process and node processing are stopped by autonomous control of each node without using a management table. As a result, a reduction of power consumption and a reduction of processing resources are achieved.

Specifically, there are included, for example, a data processing unit and a data output management unit. The data processing unit performs predetermined processing on data input from an upstream node. The data output management unit outputs, to a downstream node, the data on which the predetermined processing has been performed in the data processing unit, and monitors the state of the downstream node. In the case of detecting that there is no downstream node using the output data, the data output management unit controls the data processing unit to stop the data processing. The stop of node processing and inter-node data input/output are performed upstream in a chain manner.

The present configuration achieves a configuration in which an inter-node data input/output process and node processing are stopped by autonomous control of each node without using a management table. As a result, a reduction of power consumption and a reduction of processing resources are achieved.

REFERENCE SIGNS LIST 11 to 14 Node
15 Data processing management unit
21 to 24 Node
100 Autonomous mobile apparatus
110 Sensor unit
111 LiDAR
112 Front distance sensor
113 Rear distance sensor
114 RGB camera
120 Sensor control unit
121 LiDAR control unit
122 Front distance sensor control unit
123 Rear distance sensor control unit
124 RGB camera control unit
130 Sensor information analysis unit
131 Obstacle detection unit
132 Vehicle detection unit
140 Action planning unit
141 Forward action planning unit
142 Backward action planning unit
143 Vehicle following planning unit
151 Drive control unit
152 Drive unit
210 Data input management unit
211 LiDAR information input management unit
212 Front distance sensor information input management unit
213 Rear distance sensor information input management unit
220 Obstacle detection process execution unit
230 Data output management unit
231 Forward action planning unit data output management unit
232 Backward action planning unit data output management unit
233 Vehicle tracking planning unit data output management unit
241 to 243 Upstream node
250 Node
260 Data input management unit
261 First upstream node input data management unit
262 Second upstream node input data management unit
263 Third upstream node input data management unit
270 Node processing execution unit
280 Data output management unit
281 First downstream node output data management unit
282 Second downstream node output data management unit
291 to 292 Downstream node
300 Autonomous mobile apparatus 310 Sensor unit
311 First TOF
312 Second TOF
320 Sensor control unit
321 First TOF control unit
322 Second TOF control unit
330 Sensor information analysis unit
331 Obstacle detection unit
340 Action planning unit
341 Traveling action planning unit
351 Drive control unit
352 Drive unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An autonomous mobile apparatus comprising:
a sensor;
sensor control circuitry that controls the sensor;
sensor information analysis circuitry that receives an input of information output from the sensor, and generates sensor analysis information;
action plan determination circuitry that receives an input of the sensor analysis information, and creates an action plan;
drive control circuitry that performs drive control according to the action plan; and
a driver that drives the autonomous mobile apparatus under the control of the drive control circuitry,
wherein each of the sensor control circuitry, the sensor information analysis circuitry, the action plan determination circuitry, and the drive control circuitry includes one or more nodes, and is configured such that data output from an upstream node are input to a downstream node, the one or more nodes being configured to perform node-specific data processing,
at least some of the nodes include:
data processing circuitry that performs predetermined processing on data input from an upstream node; and
data output management circuitry that outputs, to a downstream node, the data on which the predetermined processing has been performed in the data processing circuitry, and monitors a state of the downstream node, and
the data output management circuitry controls the data processing circuitry to stop the data processing in a case of detecting that there is no downstream node using the output data.

2. The autonomous mobile apparatus according to claim 1, wherein
in a case of detecting that there are two types of downstream nodes which are a downstream node that has stopped using the output data and a downstream node continuing to use the output data, the data output management circuitry stops outputting data to the downstream node that has stopped using the output data, and
the autonomous mobile apparatus continues the data processing in the data processing circuitry and data input from the upstream node.

3. The autonomous mobile apparatus according to claim 1, wherein
data processing at nodes and an inter-node data input/output process are stopped in a chain manner from the downstream node toward the upstream node.

4. The autonomous mobile apparatus according to claim 1, wherein
the node included in the sensor control circuitry also stops a sensor to be controlled, along with the stop of the processing in the data processing circuitry.

5. The autonomous mobile apparatus according to claim 1, wherein
the driver includes at least one of a motor, an accelerator, a brake, or a moving direction control mechanism.

6. An autonomous locomotion control method to be performed in an autonomous mobile apparatus, the autonomous mobile apparatus including:
a sensor;
sensor control circuitry that controls the sensor;
sensor information analysis circuitry that receives an input of information output from the sensor, and generates sensor analysis information;
action plan determination circuitry that receives an input of the sensor analysis information, and creates an action plan;
drive control circuitry that performs drive control according to the action plan; and
a driver that drives the autonomous mobile apparatus under the control of the drive control circuitry,
wherein each of the sensor control circuitry, the sensor information analysis circuitry, the action plan determination circuitry, and the drive control circuitry includes one or more nodes, and is configured such that data output from an upstream node are input to a downstream node, the one or more nodes being configured to perform node-specific data processing, and
at least some of the nodes perform:
causing data processing circuitry to perform predetermined processing on data input from an upstream node; and
causing data output management circuitry to output, to a downstream node, the data on which the predetermined processing has been performed in the data processing circuitry, monitor a state of the downstream node, and control the data processing circuitry to stop the data processing in a case of detecting that there is no downstream node using the output data.

* * * * *